(12) United States Patent
Zhang

(10) Patent No.: US 10,958,443 B2
(45) Date of Patent: *Mar. 23, 2021

(54) CONFIDENTIAL BLOCKCHAIN TRANSACTIONS

(71) Applicant: Advanced New Technologies Co., Ltd., George Town (KY)

(72) Inventor: Wenbing Zhang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/945,157

(22) Filed: Jul. 31, 2020

(65) Prior Publication Data

US 2020/0412550 A1 Dec. 31, 2020

Related U.S. Application Data

(63) Continuation of application No. 16/811,469, filed on Mar. 6, 2020, which is a continuation of application No. PCT/CN2020/070827, filed on Jan. 8, 2020.

(30) Foreign Application Priority Data

Jun. 26, 2019 (CN) .......................... 201910562997.2

(51) Int. Cl.
*G06Q 20/02* (2012.01)
*H04L 9/32* (2006.01)
(Continued)

(52) U.S. Cl.
CPC ....... *H04L 9/3255* (2013.01); *G06Q 20/0655* (2013.01); *G06Q 20/3676* (2013.01);
(Continued)

(58) Field of Classification Search
CPC ... H04L 9/3255; H04L 9/0637; H04L 9/0869; H04L 9/3066; G06Q 20/0655;
(Continued)

(56) References Cited

U.S. PATENT DOCUMENTS 6,299,062 B1 * 10/2001 Hwang ................... G06F 21/33
235/379
2004/0123098 A1    6/2004 Chen
(Continued)

FOREIGN PATENT DOCUMENTS

CN    109242485    1/2019
CN    109257184    1/2019
(Continued)

OTHER PUBLICATIONS

Moreno-Sanchez et al., 'DLSAG: Non-Interactive Refund Transactions for Interoperable Payment Channels in Monero,' May 29, 2019 (Year: 2019).*

(Continued)

*Primary Examiner* — Farid Homayounmehr
*Assistant Examiner* — Thanh T Le
(74) *Attorney, Agent, or Firm* — Fish & Richardson P.C.

(57) ABSTRACT

A computer-implemented method includes: determining assets held by a remitter, the assets to be spent in a remittance transaction between the remitter and one or more payees, in which each asset corresponds to a respective asset identifier, a respective asset amount, and a respective asset commitment value; determining a remitter pseudo public key and a remitter pseudo private key; determining a cover party pseudo public key, in which the cover party pseudo public key is obtained based on asset commitment values of assets held by the cover party; and generating a linkable ring signature for the remittance transaction.

20 Claims, 9 Drawing Sheets

(51) Int. Cl.
*H04L 9/08* (2006.01)
*H04L 9/30* (2006.01)
*H04L 9/06* (2006.01)
*G06Q 20/38* (2012.01)
*G06Q 20/36* (2012.01)
*G06Q 20/06* (2012.01)
*G06Q 40/02* (2012.01)

(52) U.S. Cl.
CPC ..... *G06Q 20/3678* (2013.01); *G06Q 20/3825* (2013.01); *G06Q 20/3829* (2013.01); *G06Q 20/38215* (2013.01); *G06Q 40/02* (2013.01); *H04L 9/0637* (2013.01); *H04L 9/0869* (2013.01); *H04L 9/3066* (2013.01); *G06Q 2220/00* (2013.01); *H04L 2209/38* (2013.01)

(58) Field of Classification Search
CPC ......... G06Q 20/3678; G06Q 20/38215; G06Q 20/3825; G06Q 20/3829; G06Q 40/02
USPC ........................................................ 713/180
See application file for complete search history.

(56) References Cited

U.S. PATENT DOCUMENTS

| | | | |
|---|---|---|---|
| 2008/0141035 A1* | 6/2008 | Furukawa | H04L 9/3221 713/180 |
| 2012/0159153 A1 | 6/2012 | Shim | |
| 2014/0025944 A1 | 1/2014 | Maletsky | |
| 2014/0081672 A1 | 3/2014 | Chawla | |
| 2014/0281554 A1 | 9/2014 | Maletsky | |
| 2016/0330034 A1 | 11/2016 | Back | |
| 2016/0358165 A1* | 12/2016 | Maxwell | G06Q 20/0655 |
| 2018/0076957 A1 | 3/2018 | Watanabe et al. | |
| 2019/0164153 A1* | 5/2019 | Agrawal | G06Q 20/383 |
| 2019/0354963 A1 | 11/2019 | Di Iorio | |
| 2020/0073698 A1 | 3/2020 | Wu | |
| 2020/0097967 A1 | 3/2020 | Patel | |
| 2020/0127817 A1 | 4/2020 | Wu | |
| 2020/0213134 A1 | 7/2020 | Zhang | |

FOREIGN PATENT DOCUMENTS

| | | |
|---|---|---|
| CN | 109493053 | 3/2019 |
| CN | 109508970 | 3/2019 |
| CN | 109544129 | 3/2019 |
| CN | 109741171 | 5/2019 |
| CN | 110349021 | 10/2019 |
| TW | 201812674 | 4/2018 |
| WO | WO 2018209148 | 11/2018 |

OTHER PUBLICATIONS

Rebekah Mercer, 'Privacy on the Blockchain Unique Ring Signatures,' Dec. 25, 2016 (Year: 2016).*
Crosby et al., "BlockChain Technology: Beyond Bitcoin," Sutardja Center for Entrepreneurship & Technology Technical Report, Oct. 16, 2015, 35 pages.
Li et al., "Overview on Privacy Protection in Bitcoin," Journal of Cryptologic Research, May 2019, 6(2):133-149 (with English abstract).
Moreno-Sanchez et al., DLSAG: Non-Interactive Refund Transactions for Interoperable Payment Channels in Manero, May 29, 2019 (Year: 2019).
Nakamoto, "Bitcoin: A Peer-to-Peer Electronic Cash System," www.bitcoin.org, 2005, 9 pages.
PCT International Search Report and Written Opinion in International Application No. PCT/CN2020/070827, dated Apr. 8, 2020, 21 pages (with machine translation).
Torres et al., "Post-Quantum One-Time Linkable Ring Signature and Application to Ring Confidential Transactions in Blockchain," Springer International Publishing AG, part of Springer Nature 2018, Dec. 2018, pp. 558-576.

* cited by examiner

CONFIDENTIAL BLOCKCHAIN TRANSACTIONS

CROSS-REFERENCE TO RELATED APPLICATIONS

This application is a continuation of U.S. application Ser. No. 16/811,469, filed Mar. 6, 2020, which is a continuation of PCT Application No. PCT/CN2020/070827, filed on Jan. 8, 2020, which claims priority to Chinese Patent Application No. 201910562997.2, filed on Jun. 26, 2019, and each application is hereby incorporated by reference in its entirety.

TECHNICAL FIELD

One or more implementations of the present specification relate to the field of blockchain technologies, and in particular, to methods and apparatuses for implementing a confidential transaction in a blockchain.

BACKGROUND

The blockchain technology (also referred to as the distributed ledger technology) is a decentralized distributed database technology characterized by decentralization, openness, transparency, tamper resistance, and trustworthiness, and can be applied to many application scenarios with high requirements on data reliability.

SUMMARY

In view of this, one or more implementations of the present specification provide methods and apparatuses for implementing a confidential transaction in a blockchain.

To achieve the previous objective, one or more implementations of the present specification provide the following technical solutions:

According to a first aspect of the one or more implementations of the present specification, a method for implementing a confidential transaction in a blockchain is proposed, including: determining m assets to be spent $[ID\_j\_1, PC(t\_j\_1, r\_j\_1)]$ to $[ID\_j\_m, PC(t\_j\_m, r\_j\_m)]$ held by a remitter for a remittance transaction M between the remitter and a payee, where $ID\_j\_1$ to $ID\_j\_m$ are asset identifiers, $t\_j\_1$ to $t\_j\_m$ are asset amounts, $r\_j\_1$ to $r\_j\_m$ are random numbers, and $PC(t\_j\_1, r\_j\_1)$ to $PC(t\_j\_m, r\_j\_m)$ are asset commitments; obtaining a pseudo public key $P'''\_j=[PC(t\_j\_1, r\_j\_1)+ \ldots +PC(t\_j\_m, r\_j\_m)]-[PC(t'\_1, r'\_1)+ \ldots +PC(t'\_u, r'\_u)]$ corresponding to the remitter and a pseudo private key $r''=(r\_j\_1+ \ldots +r\_j\_m)-(r'\_1+ \ldots +r'\_u)$ corresponding to the remitter based on transfer amounts $t'\_1$ to $t'\_u$ corresponding to payees $Q\_1$ to $Q\_u$, where $PC(t'\_1, r'\_1)$ to $PC(t'\_u, r'\_u)$ are transfer amount commitments, and $r'\_1$ to $r'\_u$ are random numbers; obtaining a pseudo public key $P'''\_i=[PC\{i, 1\}+ \ldots +PC\{i, m\}]-[PC(t'\_1, r'\_1)+ \ldots +PC(t'\_u, r'\_u)]$ corresponding to a selected cover party i based on m assets $[ID\_i\_1, PC\{i, 1\}]$ to $[ID\_i\_m, PC\{i, m\}]$ held by the cover party i, where $i \in [1, j-1] \cup [j+1, n]$; and generating a linkable ring signature for the remittance transaction M based on a private key $x\_j$, a public key $P\_j$, the pseudo private key $r''$, and the pseudo public key $P'''\_j$ that correspond to the remitter and a public key $P\_i$ and the pseudo public key $P'''\_i$ that correspond to the cover party i, where the linkable ring signature includes key images $I\_1$ to $I\_m$, and values of the key images $I\_1$ to $I\_m$ are related to the private key $x\_j$ and the public key $P\_j$ of the remitter and the asset identifiers $ID\_j\_1$ to $ID\_j\_m$.

According to a second aspect of the one or more implementations of the present specification, a method for implementing a confidential transaction in a blockchain is proposed, including: obtaining key images $I\_1$ to $I\_m$ included in a linkable ring signature of a remittance transaction M, where values of the key images $I\_1$ to $I\_m$ are related to a private key $x\_j$ and a public key $P\_j$ of a remitter and asset identifiers $ID\_j\_1$ to $ID\_j\_m$, where the asset identifiers $ID\_j\_1$ to $ID\_j\_m$ correspond to assets $[ID\_j\_1, PC(t\_j\_1, r\_j\_1)]$ to $[ID\_j\_m, PC(t\_j\_m, r\_j\_m)]$ held by the remitter, $t\_j\_1$ to $t\_j\_m$ are asset amounts, $r\_j\_1$ to $r\_j\_m$ are random numbers, and $PC(t\_j\_1, r\_j\_1)$ to $PC(t\_j\_m, r\_j\_m)$ are asset commitments; verifying the linkable ring signature, where the linkable ring signature is generated by the remitter based on the private key $x\_j$, the public key $P\_j$, a pseudo private key $r''$, and a pseudo public key $P'''\_j$ that correspond to the remitter, and a public key $P\_i$ and a pseudo public key $P'''\_i$ that correspond to a cover party i, where when the linkable ring signature is successfully verified, it is determined that a sum of the asset amounts $t\_j\_1$ to $t\_j\_m$ is equal to a sum of transfer amounts $t'\_1$ to $t'\_u$ that correspond to payees $Q\_1$ to $Q\_u$, where $P'''\_j=[PC(t\_j\_1, r\_j\_1)+ \ldots +PC(t\_j\_m, r\_j\_m)]-[PC(t'\_1, r'\_1)+ \ldots +PC(t'\_u, r'\_u)]$, $r''=(r\_j\_1+ \ldots +r\_j\_m)-(r'\_1+ \ldots +r'\_u)$, the cover party i holds assets $[ID\_i\_1, PC\{i, 1\}]$ to $[ID\_i\_m, PC\{i, m\}]$, $P'''\_i=[PC(i, 1)+ \ldots +PC(i, m)]-[PC(t'\_1, r'\_1)+ \ldots +PC(t'\_u, r'\_u)]$, $PC(t'\_1, r'\_1)$ to $PC(t'\_u, r'\_u)$ are transfer amount commitments, $r'\_1$ to $r'\_u$ are random numbers, and $i \in [1, j-1] \cup [j+1, n]$; and executing the remittance transaction M when a transaction execution condition is satisfied, where the transaction execution condition includes the following: the key images $I\_1$ to $I\_m$ are different from historical key images, and the linkable ring signature is successfully verified.

According to a third aspect of the one or more implementations of the present specification, an apparatus for implementing a confidential transaction in a blockchain is proposed, including: an asset determining unit, configured to determine m pieces of assets to be spent $[ID\_j\_1, PC(t\_j\_1, r\_j\_1)]$ to $[ID\_j\_m, PC(t\_j\_m, r\_j\_m)]$ held by a remitter for a remittance transaction M between the remitter and a payee, where $ID\_j\_1$ to $ID\_j\_m$ are asset identifiers, $t\_j\_1$ to $t\_j\_m$ are asset amounts, $r\_j\_1$ to $r\_j\_m$ are random numbers, and $PC(t\_j\_1, r\_j\_1)$ to $PC(t\_j\_m, r\_j\_m)$ are asset commitments; a first acquisition unit, configured to obtain a pseudo public key $P'''\_j=[PC(t\_j\_1, r\_j\_1)+ \ldots +PC(t\_j\_m, r\_j\_m)]-[PC(t'\_1, r'\_1)+ \ldots +PC(t'\_u, r'\_u)]$ corresponding to the remitter and a pseudo private key $r''=(r\_j\_1+ \ldots +r\_j\_m)-(r'\_1+ \ldots +r'\_u)$ corresponding to the remitter based on transfer amounts $t'\_I$ to $t'\_u$ corresponding to payees $Q\_1$ to $Q\_u$, where $PC(t'\_1, r'\_1)$ to $PC(t'\_u, r'\_u)$ are transfer amount commitments, and $r'\_1$ to $r'\_u$ are random numbers; a second acquisition unit, configured to obtain a pseudo public key $P'''\_i=[PC\{i, 1\}+ \ldots +PC\{i, m\}]-[PC(t'\_1, r'\_1)+ \ldots +PC(t'\_u, r'\_u)]$ corresponding to a selected cover party i based on m assets $[ID\_i\_1, PC\{i, 1\}]$ to $[ID\_i\_m, PC\{i, m\}]$ held by the cover party i, where $i \in [1, j-1] \cup [j+1, n]$; and a signature unit, configured to generate a linkable ring signature for the remittance transaction M based on a private key $x\_j$, a public key $P\_j$, the pseudo private key $r''$, and the pseudo public key $P'''\_j$ that correspond to the remitter and a public key $P\_i$ and the pseudo public key $P'''\_i$ that correspond to the cover party i, where the linkable ring signature includes key images $I\_1$ to $I\_m$, and values of the key images $I\_1$ to $I\_m$ are related to the private key $x\_j$ and the public key $P\_j$ of the remitter and the asset identifiers $ID\_j\_1$ to $ID\_j\_m$.

According to a fourth aspect of the one or more implementations of the present specification, an apparatus for implementing a confidential transaction in a blockchain is proposed, including: an image acquisition unit, configured to obtain key images $I\_1$ to $I\_m$ included in a linkable ring signature of a remittance transaction M, where values of the key images $I\_1$ to $I\_m$ are related to a private key $x\_j$ and a public key $P\_j$ of a remitter and asset identifiers $ID\_j\_1$ to $ID\_j\_m$, where the asset identifiers $ID\_j\_1$ to $ID\_j\_m$ correspond to assets $[ID\_j\_1, PC(t\_j\_1, r\_j\_1)]$ to $[ID\_j\_m, PC(t\_j\_m, r\_j\_m)]$ held by the remitter, $t\_j\_1$ to $t\_j\_m$ are asset amounts, $r\_j\_1$ to $r\_j\_m$ are random numbers, and $PC(t\_j\_1, r\_j\_1)$ to $PC(t\_j\_m, r\_j\_m)$ are asset commitments; a signature verification unit, configured to verify the linkable ring signature, where the linkable ring signature is generated by the remitter based on the private key $x\_j$, the public key $P\_j$, a pseudo private key $r''$, and a pseudo public key $P'''\_j$ that correspond to the remitter, and a public key $P\_i$ and a pseudo public key $P'''\_i$ that correspond to a cover party i, where when the linkable ring signature is successfully verified, it is determined that a sum of the asset amounts $t\_j\_1$ to $t\_j\_m$ is equal to a sum of transfer amounts $t'\_1$ to $t'\_u$ that correspond to payees $Q\_1$ to $Q\_u$, where $P'''\_j=[PC(t\_j\_1, r\_j\_1)+\ldots+PC(t\_j\_m, r\_j\_m)]-[PC(t'\_1, r'\_1)+\ldots+PC(t'\_u, r'\_u)]$, $r''=(r\_j\ 1+\ldots+r\_j\_m)-(r'1+\ldots+r'\_u)$, the cover party i holds assets $[ID\_i\_1, PC\{i, 1\}]$ to $[ID\_i\_m, PC\{i, m\}]$, $P'''\_i=[PC(i, 1)+\ldots+PC(i, m)]-[PC(t'\_1, r'\_1)+\ldots+PC(t'\_u, r'\_u)]$, $PC(t'\_1, r'\_1)$ to $PC(t'\_u, r'\_u)$ are transfer amount commitments, $r'\_1$ to $r'\_u$ are random numbers, and $i\in[1, j-1]\cup[j+1, n]$; and a transaction execution unit, configured to execute the remittance transaction M when a transaction execution condition is satisfied, where the transaction execution condition includes the following: the key images $I\_1$ to $I\_m$ are different from historical key images, and the linkable ring signature is successfully verified.

According to a fifth aspect of the one or more implementations of the present specification, an electronic device is proposed, including: a processor; and a memory, configured to store an instruction executable by the processor, where the processor runs the executable instruction to implement the method according to the first aspect.

According to a sixth aspect of the one or more implementations of the present specification, a computer-readable storage medium is proposed, where the computer-readable storage medium stores a computer instruction, and when the instruction is executed by a processor, steps of the method according to the first aspect are implemented.

According to a seventh aspect of the one or more implementations of the present specification, an electronic device is proposed, including: a processor; and a memory, configured to store an instruction executable by the processor, where the processor runs the executable instruction to implement the method according to the second aspect.

According to an eighth aspect of one or more implementations of the present specification, a computer-readable storage medium is proposed, where the computer-readable storage medium stores a computer instruction, and when the instruction is executed by a processor, steps of the method according to the second aspect are implemented.

DESCRIPTION OF IMPLEMENTATIONS

Example implementations are described in detail here, and examples of the example implementations are presented in the accompanying drawings. When the following description relates to the accompanying drawings, unless specified otherwise, same numbers in different accompanying drawings represent same or similar elements. Example implementations described in the following do not represent all implementations consistent with one or more implementations of the present specification. On the contrary, the implementations are only examples of apparatuses and methods that are described in the appended claims in detail and consistent with some aspects of one or more implementations of the present specification.

Notably, steps of a corresponding method in another implementation are not necessarily performed in a sequence shown and described in the present specification. In some other implementations, the method thereof can include more or less steps than those described in the present specification. In addition, a single step described in the present specification may be divided into multiple steps for description in other implementations; and multiple steps described in the present specification may be combined into a single step for description in other implementations.

Figure 1:
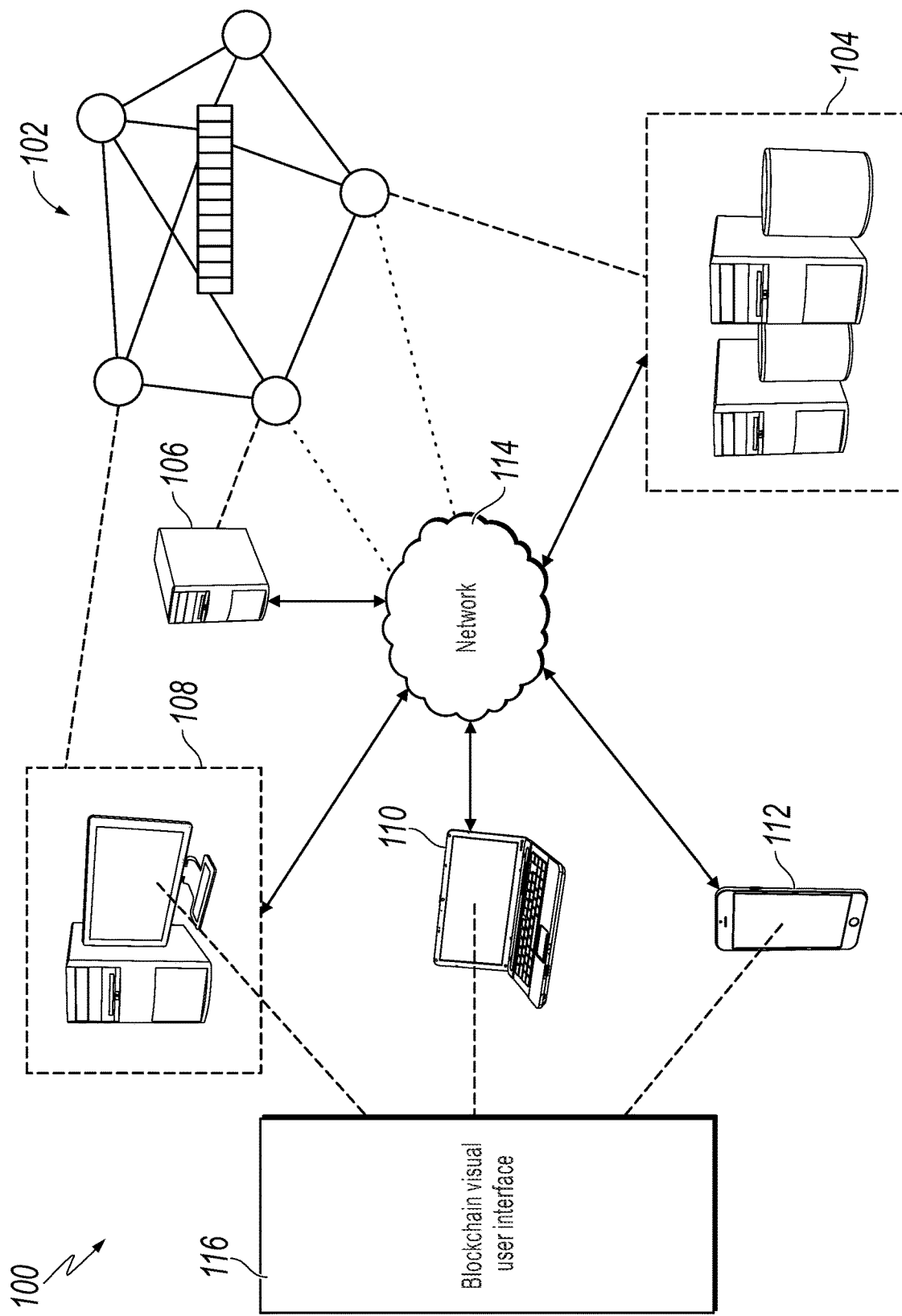
FIG. 1 is a schematic diagram illustrating an example environment, according to an example implementation.

FIG. 1 is a schematic diagram illustrating an example environment, according to an example implementation. As shown in FIG. 1, an example environment 100 allows entities to participate in a blockchain network 102. The blockchain network 102 can be a blockchain network of a public type, a private type, or a consortium type. The example environment 100 can include computing devices 104, 106, 108, 110, and 112, and a network 114. In an implementation, the network 114 can include a local area network (LAN), a wide area network (WAN), the Internet, or a combination thereof, and can be connected to a website, user device (e.g., a computing device), and a backend system. In an implementation, the network 114 can be accessed in a wired and/or wireless communication way.

In some cases, the computing devices 106 and 108 can be nodes (not shown) in a cloud computing system, or each of the computing devices 106 and 108 can be a separate cloud computing system, including multiple computers interconnected by a network and operating as a distributed processing system.

In an implementation, the computing devices 104 to 108 can run any suitable computing system so that the computing system can function as a node in the blockchain network 102. For example, the computing devices 104 to 108 can include but are not limited to a server, a desktop computer, a notebook computer, a tablet computing device, and a smartphone. In an implementation, the computing devices 104 to 108 can belong to a related entity and be configured to implement a corresponding service. For example, the service can be used to manage transactions of a certain entity or between multiple entities.

In an implementation, the computing devices 104 to 108 separately store blockchain ledgers corresponding to the blockchain network 102. The computing device 104 can be (or include) a network server configured to provide a browser function, and the network server can provide graphical information related to the blockchain network 102 based on the network 114. In some cases, the computing device 104 may not participate in block verification, but rather monitor the blockchain network 102 to determine when other nodes (which can include, for example, the computing devices 106 to 108) reach a consensus, and therefore the computing device 104 can generate a corresponding blockchain graphical user interface.

In an implementation, the computing device 104 can receive a request from a client device (such as the computing device 110 or the computing device 112) for a blockchain graphical user interface. In some cases, a node of the blockchain network 102 can also be used as a client device. For example, a user of the computing device 108 can send the previous request to the computing device 104 by using a browser running on the computing device 108.

In response to the previous request, the computing device 104 can generate a blockchain graphical user interface (such as a web page) based on the stored blockchain ledger, and send the generated blockchain graphical user interface to the requesting client device. If the blockchain network 102 is a blockchain network of the private type or the consortium type, the request for a blockchain graphical user interface can include user authorization information. Before the blockchain graphical user interface is generated and sent to the requesting client device, the computing device 104 can verify the user authorization information, and after the verification succeeds, return a corresponding blockchain graphical user interface.

The blockchain graphical user interface can be displayed on the client device (for example, displayed on a user interface 116 shown in FIG. 1). When the blockchain ledger is updated, displayed content on the user interface 116 can also be updated accordingly. In addition, interaction between the user and the user interface 116 can result in a request for another user interface, for example, displaying a block list, block details, a transaction list, transaction details, an account list, account details, a contract list, contract details, or a search result page generated by the user by searching a blockchain network.

Figure 2:
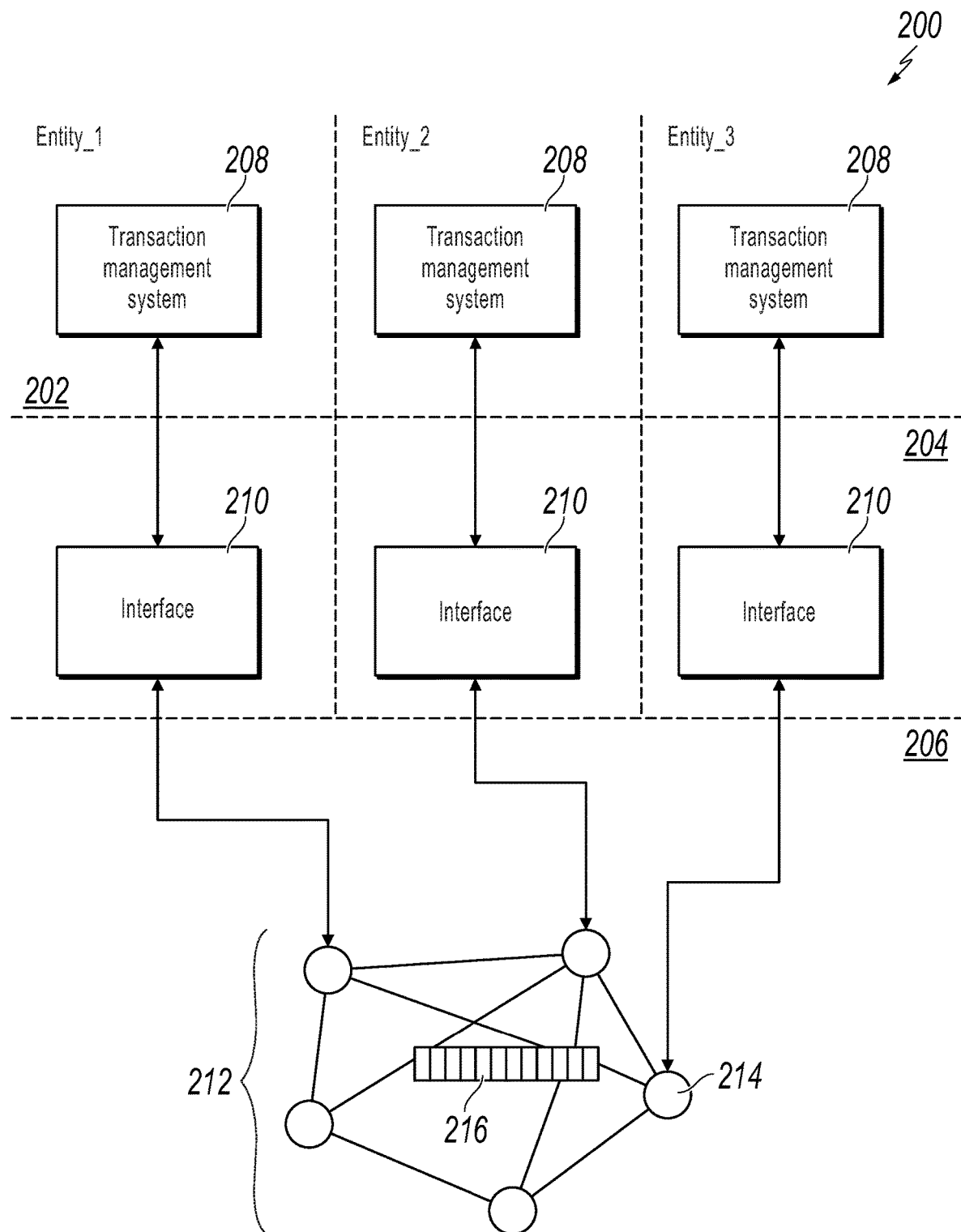
FIG. 2 is a schematic diagram illustrating a conceptual architecture, according to an example implementation.

FIG. 2 is a schematic diagram illustrating a conceptual architecture, according to an example implementation. As shown in FIG. 2, the conceptual architecture 200 includes an entity layer 202, a managed service layer 204, and a blockchain network layer 206. For example, the entity layer 202 can include three entities: entity 1, entity 2, and entity 3, each having its own transaction management system 208.

In an implementation, the managed service layer 204 can include an interface 210 corresponding to each transaction management system 208. For example, each transaction management system 208 communicates with its interface 210 over a network (for example, the network 114 in FIG. 1) by using a protocol (for example, Hypertext Transfer Protocol Secure (HTTPS)). In some examples, each interface 210 can provide a communication connection between its respective transaction management system 208 and the blockchain network layer 206. More specifically, the interface 210 can communicate with a blockchain network 212 of the blockchain network layer 206. In some examples, communication between the interface 210 and the blockchain network layer 206 can be implemented by using remote procedure calls (RPCs). In some examples, the interface 210 can provide an API for accessing the blockchain network 212 to the transaction management system 208.

As described in the present specification, the blockchain network 212 is provided in a form of a peer-to-peer network. The peer-to-peer network includes multiple nodes 214 that are configured to persist blockchain ledgers 216 formed by chaining block data. FIG. 2 shows only one blockchain ledger 216, but multiple blockchain ledgers 216 or copies of the blockchain ledgers 216 can exist in the blockchain network 212. For example, each node 214 can separately maintain one blockchain ledger 216 or a copy of the blockchain ledger 216.

It should be noted that a transaction (transaction) described in the present specification refers to a piece of data that is created by a user by using a client of a blockchain and that needs to be finally released to a distributed database of the blockchain. A transaction in a blockchain can be a transaction in a narrow sense and a transaction in a broad sense. A transaction in the narrow sense refers to a value transfer released by a user to a blockchain. For example, in a conventional bitcoin blockchain network, a transaction can be a transfer initiated by a user in the blockchain. A transaction in the broad sense refers to a piece of service data that is released by a user to a blockchain and that has a service intention. For example, an operator can establish a consortium blockchain based on an actual service demand, and deploy some other types of online services (for example, a rental service, a vehicle dispatch service, an insurance claims service, a credit service, and a medical service) that are unrelated to a value transfer in the consortium blockchain. In the consortium blockchain, a transaction can be a service message or a service request that is released by a user in the consortium blockchain and that has a service intention.

Blockchains are generally classified into three types: public blockchains, private blockchains, and consortium blockchains. In addition, there are combinations of multiple types, for example, different combinations such as private blockchain+consortium blockchain and consortium blockchain+public blockchain. Public blockchains are the most decentralized. Public blockchains are represented by bitcoin and Ethereum. Participants of a public blockchain can read data records on the blockchain, participate in transactions, and contend for accounting rights of new blocks, etc. Moreover, each participant (namely, node) can freely join or exit a network, and perform a related operation. On the contrary, for a private blockchain, a write permission of the network is controlled by a certain organization or institution, and a data read permission is specified by the organization. Simply speaking, the private blockchain can be a weak centralized system, and has few participant nodes, which are strictly limited. This type of blockchain is more suitable for internal use in a specific institution. A consortium blockchain is a blockchain between a public blockchain and a private blockchain, and can implement "partial decentralization". Each node in the consortium blockchain usually corresponds to an entity institution or organization. Participants join a network after being authorized and form an interest-related consortium to jointly maintain running of the blockchain.

With a distributed architecture used in a blockchain network and a chain structure used between the blocks, information can be permanently recorded in a blockchain ledger maintained by each blockchain node, without being tampered with. However, information privacy cannot be guaranteed due to full disclosure of the blockchain ledger. For example, any user can query the blockchain ledger on any blockchain node to determine information such as assets held by a certain user and a transfer amount of a certain transaction, while the information may be sensitive and need to be hidden.

For the purpose of privacy protection, a commitment-based confidential transaction solution is proposed in a related technology. Assets held by each user and transfer amounts involved in transactions can be generated as corresponding committed amounts. In addition, the blockchain ledger records only the committed amounts, rather than directly recording plaintext asset amounts, transaction amounts, etc. For example, when the Pedersen commitment mechanism is used, assuming that an original amount is t, corresponding committed amounts can be $PC(t, r)=r \times G+t \times H$, where G and H are random generators on an elliptic curve, r is a random number, and a value of r is only known by an asset holder, a transaction participant, etc., so that an irrelevant person cannot reversely calculate the original amount t based on only a value of $PC(t, r)$. In addition, committed amounts further have a homomorphic characteristic, so that the committed amounts can be directly used in calculation, for example, $PC(t1, r1)-PC(t2, r2)=PC(t1-t2, r1-r2)$. However, when verifying a transaction, a blockchain node cannot determine, based on a committed amount, whether a relevant condition is satisfied, for example, an inward remittance amount of the transaction is equal to an outward remittance amount or another condition. Therefore, relevant proof information is needed to ensure successful completion of the transaction.

In addition, a signature is needed for a user to initiate a transaction in a blockchain network. For example, when user A wants to spend an asset held by user A in a blockchain, user A can initiate a blockchain transaction and sign the transaction by using a private key $x\_j$ held by user A. Correspondingly, the previous signature can be verified by using a public key $P\_j$ corresponding to the private key $x\_j$ held by user A. However, direct verification on the signature also exposes that user A is a signer of the corresponding signature, disclosing privacy of user A.

For the purpose of protecting an identity of a signer, a related technology proposes a ring signature-based processing solution. User A can hide the public key $P\_j$ held by user A in a group of public keys $(P\_1, \ldots, P\_n)$, where the public keys $P\_1$ to $P\_{j-1}$ and $P\_{j+1}$ to $P\_n$ respectively belong to other users. Then, user A generates a signature by using the private key $x\_j$ held by user A and the previous group of public keys $(P\ P\_n)$. In this case, a verifier can verify that the signature is generated by using a private key corresponding to one in the previous group of public keys $(P\_1, \ldots, P\_n)$, but cannot determine which particular public key is used, so as to hide the identity of the signer by using the previous group of public keys $(P\_1, \ldots, P\_n)$.

It can be understood that, when the description above is in the form of $(P\_1, \ldots, P\_n)$, although the group of public keys seems to start from $P\_1$ and end with $P\_n$, the verifier actually cannot determine a sequence of the public keys, and equivalently the group of public keys presents a ring structure without a head and a tail and therefore is referred to as a ring signature.

Although the ring signature solution can hide the identity of the signer, a "double-spending" problem can be caused when the ring signature solution is applied to a transaction in a blockchain network. For example, a blockchain network can perform asset management by using an Unspent Transaction Output (UTXO) model: Blockchain assets held by a user are recorded as outputs of corresponding transactions, and for each transaction, one or more unspent transaction outputs are used as inputs of the transaction, and one or more outputs are correspondingly generated. Typically, UTXO is applied to bitcoin and its derived cryptocurrency. When the ring signature solution is applied to a UTXO model-based blockchain network, a same asset may be referenced by multiple transactions. However, because an identity of a signer is hidden in the ring signature solution, a verifier cannot identify that the same asset is repeatedly referenced, which causes the "double-spending" problem.

Therefore, a related technology proposes an improved solution of the ring signature solution, which is referred to as Linkable Sponsored Anonymous Group Signature (LSAG). The LSAG solution can generate a key image used to identify a signer, but does not expose a public key corresponding to the signer in a group of ring signatures used by the signature. As such, it is ensured that an identity of the signer can be hidden and the "double-spending" problem can further be alleviated based on the key image.

Monero is used as an example. Monroe implements asset management by using the UTXO model. All assets in the model are transaction outputs of corresponding blockchain transactions, and all assets generated in a blockchain network are managed in a unified way. Each asset corresponds to a unique public/private key pair, and a user can spend the corresponding asset by using the public/private key pair. For example, when a particular asset held by a signer (for example, a remitter in a remittance transaction) corresponds to a private key $x\_j$ and a public key $P\_j$, a corresponding key image can be generated based an equation $I=x\_j \times Hash(P\_j)$. Provided that an asset has been spent, blockchain nodes record key images with a same value, thereby identifying the "double-spending" problem.

However, as each asset corresponds to a unique public/private key pair, when one transaction includes multiple assets, multiple corresponding public/private key pairs are needed. For example, when one transaction includes m assets, a signer needs to maintain m public/private key pairs, which causes very high maintenance costs of the public/private key pairs.

Therefore, the present specification proposes a new technical solution, so that a signer needs to maintain only one public/private key pair, and can generate a linkable ring signature for a transaction involving multiple assets and satisfy a demand of a confidential transaction for proof information. The following provides descriptions with reference to implementations.

Figure 3:
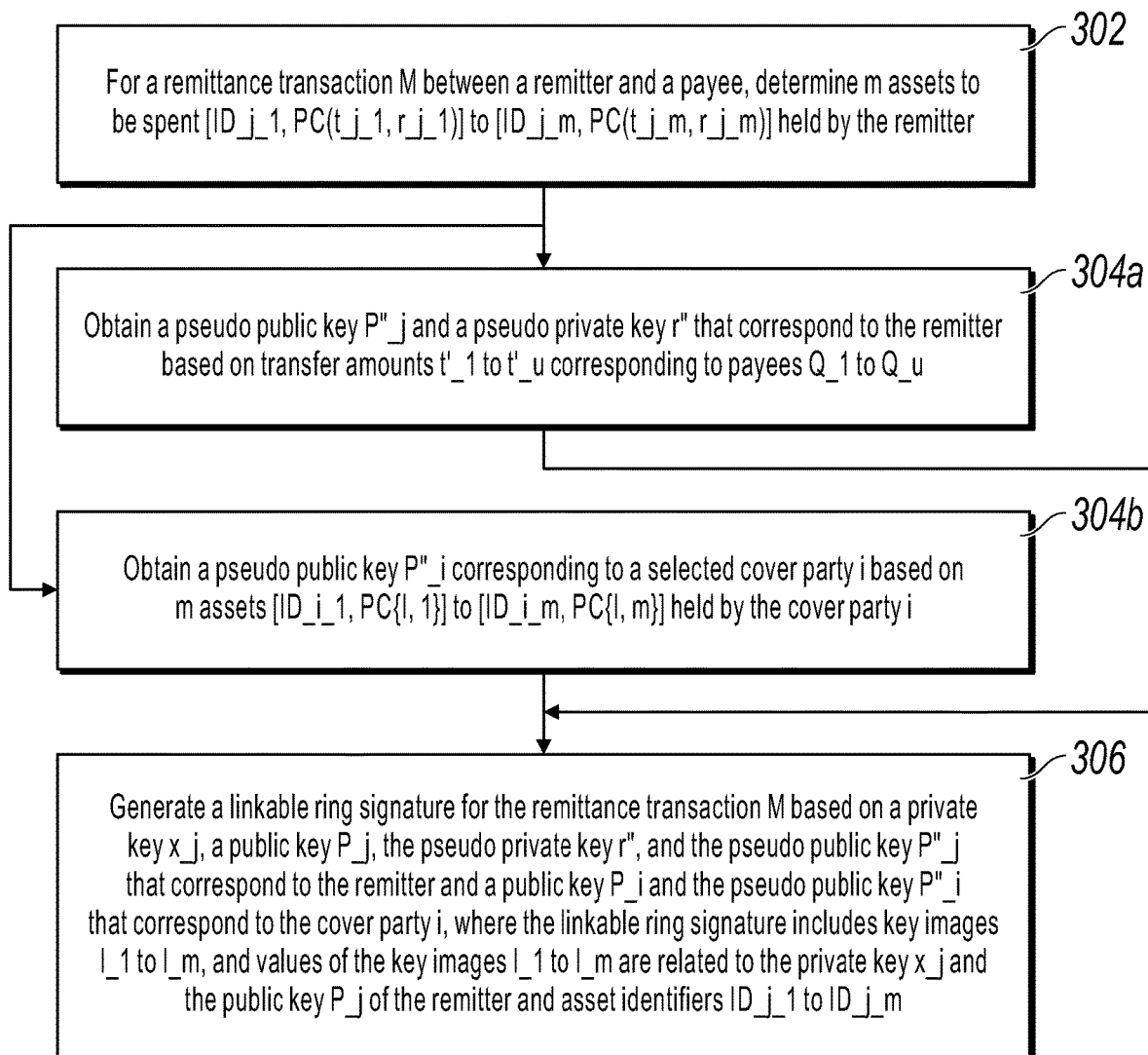
FIG. 3 is a flowchart illustrating a method for implementing a confidential transaction in a blockchain, according to an example implementation.

FIG. 3 is a flowchart illustrating a method for implementing a confidential transaction in a blockchain, according to an example implementation. As shown in FIG. 3, the method is applied to a client device and can include the following steps:

Step 302: For a remittance transaction M between a remitter and a payee, determine m pieces of assets to be spent [ID_j_1, PC(t_j_1, r_j_1)] to [ID_j_m, PC(t_j_m, r_j_m)] held by the remitter.

As described above, for the purpose of asset confidentiality, the assets held by the remitter and any other user are recorded on a blockchain ledger as corresponding committed amounts, rather than directly recorded as plaintext asset amounts. Using the assets to be spent [ID_j_1, PC(t_j_1, r_j_1)] to [ID_j_m, PC(t_j_m, r_j_m)] as an example, ID_j_1 to ID_j_m are asset identifiers, t_j_1 to t_j_m are asset amounts, the blockchain ledger records asset commitments PC(t_j_1, r_j_1) to PC(t_j_m, r_j_m) corresponding to the asset amounts t_j_1 to t_j_m, and r_j_1 to r_j_m are random numbers. Due to existence of the random numbers r_j_1 to r_j_m, the asset commitments PC(t_j_1, r_j_1) to PC(t_j_m, r_j_m) generated for the amounts t_j_1 to t_j_m are random. Except the remitter that knows the random numbers r_j_1 to r_j_m, other users can only determine the asset commitments PC(t_j_1, r_j_1) to PC(t_j_m, r_j_m), and cannot reversely calculate the corresponding asset amounts t_j_1 to t_j_m.

Although the corresponding assets are enumerated here in the form of [ID_j_1, PC(t_j_1, r_j_1)] to [ID_j_m, PC(t_j_m, r_j_m)], the corresponding assets are not necessarily recorded and stored in the blockchain ledger in a form of [identifier, asset commitment]. For example, other forms can be used or other information can further be included. The present specification sets no limitation thereto.

When the UTXO model in the related technology is used, each user such as the remitter described above or a payee or a cover party described below can have one public/private key pair that corresponds uniquely to the user. In addition, although each user has no respective account established, and assets held by a user are not managed based on an account, all assets are managed in a centralized manner, establishing an association relationship between a public/private key pair and the assets is equivalent to effectively managing the assets held by the user by using the public/private key pair. An effect of such practice is equivalent to establishing an account for each user and managing assets held by the user based on the account. In addition, the user needs to maintain only one public/private key pair in this case, and different assets are distinguished by using asset identifiers, and there is no need to maintain one public/private key pair for each asset.

Figure 4:
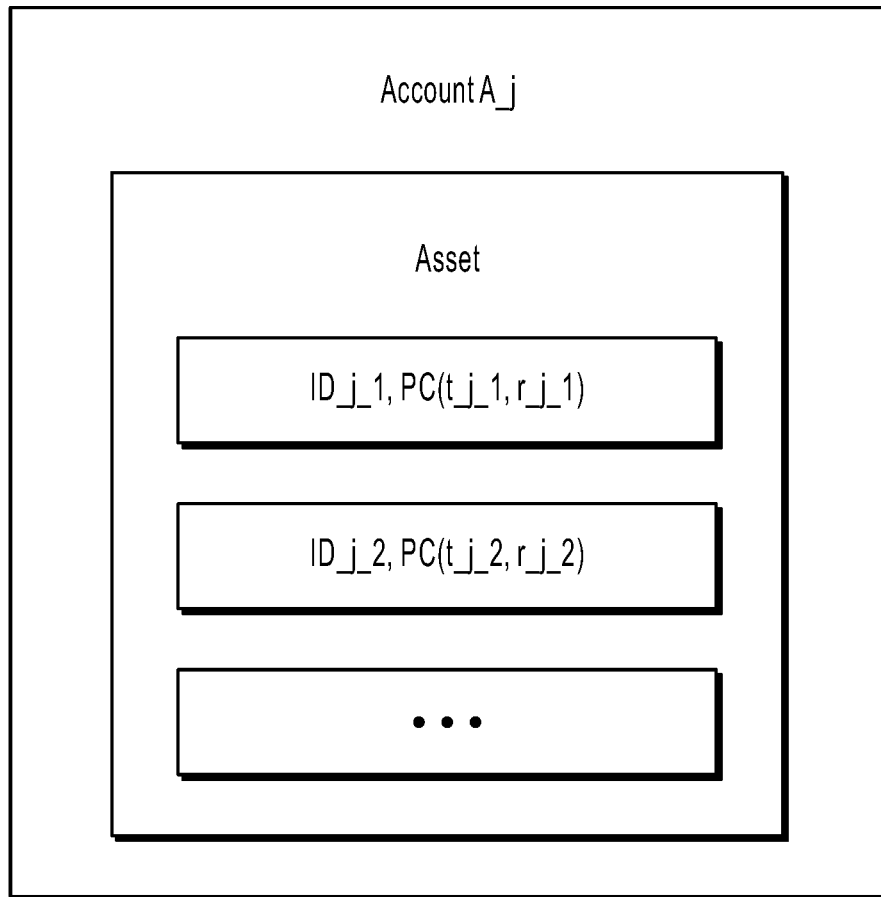
FIG. 4 is a schematic diagram illustrating an asset account model, according to an example implementation.

Certainly, the present specification can also implement asset management in a form of "account". For example, an asset management model based on the form of "account", that is, an asset account model can be implemented with reference to the UTXO model and an account model used in related technologies such as Ethereum. The asset account model can generate a corresponding account for each user, and manage assets held by the user based on the account. For example, FIG. 4 is a schematic diagram illustrating an asset account model, according to an example implementation. FIG. 4 shows account A_j corresponding to the remitter. Unlike the previous account model, account A_j does not directly record an account balance of the remitter, but records the assets held by the remitter, such as the assets [ID_j_1, PC(t_j_1, r_j_1)] and [ID_j_2, PC(t_j_2, r_j_2)]. These assets can be clearly distinguished by asset identifiers that one to one correspond to the assets. In addition, based on existence of account A_j, the remitter can manage all assets in account A_j in the centralized manner by maintaining only one public/private key pair corresponding to account A_j, for example, a private key x_j and a public key P_j, and does not need to maintain one public/private key pair for each asset. Such implementation is different from a technical solution adopted by Monroe, and can greatly reduce costs for maintaining public/private key pairs by the remitter and other users.

When the UTXO model is used, each asset is a transaction output of a corresponding historical transaction. The asset account model can maintain multiple types of assets. For example, similar to the UTXO model, an asset in the asset account model can be a transaction output of a corresponding historical transaction. For example, the assets to be spent [ID_j_1, PC(t_j_1, r_j_1)] to [ID_j_m, PC(t_j_m, r_j_m)] are transaction outputs formed in historical transactions previously performed by the remitter, and the remitter acts as a "payee" in these transactions. For another example, assets [ID_i_1, PC{i, 1}] to [ID_i_m, PC{i, m}] are transaction outputs formed in historical transactions previously performed by a cover party i, and the cover party i acts as a "payee" in these transactions. For another example, similar to the account model, the asset account model can have a corresponding account balance, and can actively divide at least a part of the account balance to form assets with a certain asset amount. For example, the assets to be spent [ID_j_1, PC(t_j_1, r_j_1)] to [ID_j_m, PC(t_j_m, r_j_m)] are generated by dividing an account balance corresponding to the remitter, and the assets [ID_i_1, PC{i, 1}] to [ID_i_m, PC{i, m}] are generated by dividing an account balance corresponding to the cover party i. When an asset is generated by dividing an account balance, all asset balances can be divided into corresponding assets for management, or some account balances can be divided into assets while a remaining account balance is still maintained in a form of numerical value (the numerical value is not shown in FIG. 4).

The assets to be spent [ID_j_1, PC(t_j_1, r_j_1)] to [ID_j_m, PC(t_j_m, r_j_m)] can be any of all assets held by the remitter. Certainly, during actual selection of assets to be spent, reference further needs to be made to a remittance amount related to the remittance transaction M and it further needs to be ensured that a sum of the assets to be spent is not less than the remittance amount.

Step 304a: Obtain a pseudo public key P"_j and a pseudo private key r" that correspond to the remitter based on transfer amounts t'_1 to t'_u corresponding to payees Q_1 to Q_u.

The previous remittance amount is an amount that needs to be remitted by the remitter to each collection target. The amounts are determined by the remitter in advance through negotiation with the collection targets, or can be determined by the remitter itself. There is a mapping relationship between the collection targets and the previous payees Q_1 to Q_u, where u≥1, indicating that one or more payees can exist.

In some cases, a sum of the asset amounts t_j_1 to t_j_m is exactly equal to a sum of transfer amounts corresponding to remittance targets. In this case, the collection targets are equivalent to the payees Q_1 to Q_u, that is, the payees Q_1 to Q_u are all collection targets, and the transfer amounts corresponding to the remittance targets are the previous transfer amounts t'_1 to t'_u. In other cases, a sum of the asset amounts t_j_1 to t_j_m is not equal to a sum of transfer amounts corresponding to remittance targets, but is greater than the sum of transfer amounts corresponding to remittance targets. In this case, a difference value (obtained by subtracting the sum of the transfer amounts corresponding to the remittance targets from the sum of the asset amounts t_j_1 to t_j_m) is used as a spare change amount of the remitter, and the remitter is added as a payee, so that the payees $Q\_1$ to $Q\_u$ include $u-1$ remittance targets and the remitter. It can be determined that, it is necessary to ensure that $t\_j\_1+\ldots+t\_j\_m=t'\_1+\ldots+t'\_u$, regardless of whether there is spare change, so that an inward remittance amount of the remittance transaction M is equal to an outward remittance amount of the remittance transaction M.

In the remittance transaction M, similar to the asset amounts $t\_j\_1$ to $t\_j\_m$ corresponding to the previous assets to be spent, the transfer amounts $t'\_1$ to $t'\_u$ are respectively recorded as corresponding transfer amount commitments $PC(t'\_1, r'\_1)$ to $PC(t'\_u, r'\_u)$ in the remittance transaction M, and $r'\_1$ to $r'\_u$ are random numbers. The random numbers $r'\_1$ to $r'\_u$ can be determined by the remitter, and be notified to the corresponding payees by using an off-chain channel, etc., so that the payees can perform verification based on the random numbers $r'\_1$ to $r'\_u$. For example, payee w can verify whether the following is established: $PC(t'\_w, r'\_w)=t'\_w \times G-kr'\_w \times H$, and can manage an asset corresponding to a transfer amount commitment $PC(t'\_w, r'\_w)$ obtained after the transaction is completed.

Based on the asset commitments $PC(t\_j\_1, r\_j\_1)$ to $PC(t\_j\_m, r\_j\_m)$ and the transfer amount commitments $PC(t'\_1, r'\_1)$ to $PC(t'\_u, r'\_u)$ corresponding to the assets to be spent, the following can be calculated: $P'''\_j=[PC(t\_j\_1, r\_j\_1)+\ldots+PC(t\_j\_m, r\_j\_m)]-[PC(t'\_1, r'\_1)+\ldots+PC(t'\_u, r'\_u)]$. Based on the random numbers $r\_j\_1$ to $r\_j\_m$ corresponding to the assets to be spent and the random numbers $r'\_1$ to $r'\_u$ corresponding to the transfer amounts, the following can be calculated: $r'''=(r\_j\_1+\ldots+r\_j\_m)-(r'1+\ldots+r'\_u)$. Based on the asset amounts $t\_j\_1$ to $t\_j\_m$ and the transfer amounts $t'\_1$ to $t'\_u$ corresponding to the assets to be spent, the following can be calculated: $t'''=(t\_j\_1+\ldots+t\_j\_m)-(t'\_1+\ldots+t'\_u)$. Then, based on the homomorphic characteristic described above, it can be determined that $P'''\_j=PC(r''', t''')=r''' \times G+t''' \times H$. As the remitter can ensure that $t\_j\_1+\ldots+t\_j\_m=t'\_1+\ldots+t'\_u$, $t'''=0$. Therefore, it can be determined that $P'''\_j=r''' \times G$.

As described above, the remitter only needs to maintain one public/private key pair. Before determining the public/private key pair, a number field $Z\_q$ and an elliptic curve in the number field, for example, an elliptic curve Ed25519, need to be selected, so that G and H can be two random generators of the elliptic curve, where $|G|=p$ is a large prime number (for example, not less than a predetermined numerical value), and the private key $x\_j$ of the remitter is selected from a value range $(0, p)$, and the corresponding public key is $P\_j=x\_j \times G$. A public/private key pair uniquely corresponding to another user such as a cover party or a payee can also be determined in a similar way.

It can be seen from the form that, "$P'''\_j=r''' \times G$" described above is similar to the relationship "$P\_j=x\_j \times G$" between the paired public and private keys. In addition, as described below, the cover party i certainly satisfies $P'''\_i \# '' \times G$. Therefore, $r'''$ can be considered as a private key corresponding to the remitter, and $P'''\_j$ is a public key corresponding to $r'''$. To be distinguished from the public/private key pair corresponding to the remitter, $r'''$ can be considered as a pseudo private key corresponding to the remitter and $P'''\_j$ can be considered as a pseudo public key corresponding to the remitter. Similarly, $P'''\_i$ can be considered as a pseudo public key corresponding to the cover party i.

Step 304b: Obtain a pseudo public key $P'''\_i$ corresponding to a selected cover party i based on m assets $[ID\_i\_1, PC\{i, 1\}]$ to $[ID\_i\_m, PC\{i, m\}]$ held by the cover party i.

Similar to the previous description, the following parameter $P'''\_i$ corresponding to the cover party i can be calculated: $P'''\_i=[PC\{i, 1\}+\ldots+PC\{i, m\}]-[PC(t'\_1, r'\_1)+\ldots+PC(t'\_u, r'\_u)]$, where $i \in [1, j-1] \cup [j+1, n]$. In addition, a difference value $t'''\_i$ between a sum of asset amounts corresponding to m assets held by the cover party i and a sum of the transfer amounts $t'\_1$ to $t'\_u$ can be calculated, and a difference value $r'''\_i$ between a sum of random numbers corresponding to the m assets held by the cover party i and a sum of random numbers $r'\_1$ to $r'\_u$ corresponding to the transfer amounts $t'\_1$ to $t'\_u$ can be calculated. Therefore, based on a homomorphic characteristic, it can be determined that $P'''\_i=r'''\_i \times G+t'''\_i \times H \ne r''' \times G$.

It can be seen that, the parameters $P'''\_j$ and $r'''$ both uniquely correspond to the remitter and the parameter $P'''\_i$ uniquely corresponds to the cover party i. Therefore, $r'''$ can be considered as the pseudo private key corresponding to the remitter, $P'''\_j$ can be considered as the pseudo public key corresponding to the remitter, and $P'''\_i$ can be considered as the pseudo public key corresponding to the cover party i.

Step 306: Generate a linkable ring signature for the remittance transaction M based on the private key $x\_j$, the public key $P\_j$, the pseudo private key $r'''$, and the pseudo public key $P'''\_j$ that correspond to the remitter and a public key $P\_i$ and the pseudo public key $P'''\_i$ that correspond to the cover party i, where the linkable ring signature includes key images $I\_1$ to $I\_m$, and values of the key images $I\_1$ to $I\_m$ are related to the private key $x\_j$ and the public key $P\_j$ of the remitter and the asset identifiers $ID\_j\_1$ to $ID\_j\_m$.

Generating the linkable ring signature for the remittance transaction M based on the private key $x\_j$, the public key $P\_j$, the pseudo private key $r'''$, and the pseudo public key $P'''\_j$ that correspond to the remitter and the public key $P\_i$ and the pseudo public key $P'''\_i$ that correspond to the cover party i can efficiently and compactly implement the following two verification functions: On one hand, the pseudo public key $P'''\_j$ and the pseudo private key $r'''$ satisfy $P'''\_j=r''' \times G$, and the pseudo public key $P'''\_i$ and the pseudo private key $r'''$ satisfy $P'''\_i \# '' \times G$. Therefore, when the linkable ring signature is generated based on the pseudo private key $r'''$ and the pseudo public keys $P'''\_j$ and $P'''\_i$, if the linkable ring signature is successfully verified, it can be proved that a value of a certain pseudo public key in pseudo public keys $(P'''\_P'''\_n)$ equals $r''' \times G$. In addition, the pseudo public key corresponds to the previously described $t'''=0$, so that the inward remittance amount of the remittance transaction M is equal to the outward remittance amount of the remittance transaction M. On the other hand, when the linkable ring signature is generated based on the private key $x\_j$ and the public key $P\_j$ that correspond to the remitter and the public key $P\_i$ corresponding to the cover party i, if the linkable ring signature is successfully verified, it can be proved that the linkable ring signature is obtained through signing by using a private key corresponding to a certain public key in public keys $(P\_1, \ldots, P\_n)$, so that identity verification can be completed without exposing an identity of the remitter.

The key images $I\_1$ to $I\_m$ one to one correspond to the assets to be spent $[ID\_j\_1, PC(t\_j\_1, r\_j\_1)]$ to $[ID\_j\_m, PC(t\_j\_m, r\_j\_m)]$ provided by the remitter, and are used to verify whether the corresponding assets to be spent have been spent, so as to reduce a "double spending" problem. Values of the key images $I\_1$ to $I\_m$ are related to the asset identifiers $ID\_j\_1$ to $ID\_j\_m$ of the corresponding assets, so that even if all the key images use a same public/private key pair (that is, the private key $x\_j$ and the public key $P\_j$ of the remitter), it can be ensured that the generated key images $I\_1$ to $I\_m$ are totally different based on a value difference of the asset identifiers $ID\_j\_1$ to $ID\_j\_m$. Therefore, there is no need to maintain one public/private key pair for each asset. The "double spending" problem can be reduced, while a quantity of public/private key pairs that need to be maintained by each user is irrelevant to a quantity of assets included in a transaction. For example, $I\_d=x\_j \times \text{Hash\_G}(P\_j, ID\_j\_d)$, where $d \in [1, m]$, and $\text{Hash\_G}(\ )$ is a hash function from the previous elliptic curve to the elliptic curve itself.

In addition to the previous key images $I\_1$ to $I\_m$, the remitter can further generate a key image $I\_(m+1)=r'' \times \text{Hash\_G}(P''\_j)$ based on the pseudo private key $r''$ and the pseudo public key $P''\_j$, so that $I\_(m+1)$ and the key images $I\_1$ to $I\_m$ make up a total of $m+1$ key images to jointly alleviate the "double spending" problem. Actually, values of the pseudo private key $r''$ and the pseudo public key $P''\_j$ are random, and therefore the pseudo private keys $r''$ and the pseudo public key $P''\_j$ generated for different transactions are certainly different. Therefore, when the key image $I\_(m+1)$ is generated based on the pseudo private key $r''$ and the pseudo public key $P''\_j$, a one-to-one mapping relationship can be formed between the key image $I\_(m+1)$ and a corresponding transaction. Therefore, the key image $I\_(m+1)$ can be compared with a historical key image, so as to identify a replay problem for the remittance transaction M. If the key image $I\_(m+1)$ is the same as a historical key image, it indicates that the remittance transaction M is replayed.

In a confidential transaction, an inward remittance amount needs to be equal to an outward remittance amount. Besides, some other proof information is further needed. For example, it needs to be proved that the transfer amounts $t'\_1$ to $t'\_u$ in the remittance transaction M each are not less than 0. The remitter can use the zero knowledge proof technology in related technologies to generate corresponding range proofs $RP\_1$ to $RP\_u$ for the transfer amounts $t'\_1$ to $t'\_u$, so as to prove that $t'\_1 \geq 0$ to $t'\_u \geq 0$, and add these range proofs $RP\_1$ to $RP\_u$ to transaction content of the remittance transaction M. The zero knowledge proof technology being used can be the range proof technology, for example, the Bulletproofs solution. The present specification sets no limitation thereto.

Therefore, the remittance transaction M generated by the remitter can include the following transaction content:

(1) Remitter, cover party i, and their assets: $\{[P\_1:ID\ 1\_1, \ldots, ID\ 1\_m], [P\_2:ID\_2\_1, \ldots, ID\_2\_m], \ldots, [P\_n:ID\_n\_1, \ldots, ID\_n\_m]\}$, where $P\_1$ to $P\_n$ are public keys of the corresponding remittance targets (the remitter or the cover party), for example, the public key $P\_j$ corresponding to the remitter and the public key $P\_i$ corresponding to the cover party i.

(2) Payees and their transfer amounts: $\{[Q\_1, PC(t'\_1, r'\_1)], [Q\_2, PC(t'\_2, r'\_2)], \ldots, [Q\_u, PC(t'\_u, r'\_u)]\}$.

(3) Range proofs: $RP\_I$ to $RP\_u$.

Certainly, the remittance transaction M can further include other transaction content needed in the blockchain network. For details, reference can be made to related requirements in the related technology, and details are not listed one by one here.

Then, the remitter can perform hash calculation on the transaction content of the remittance transaction M described above, and the parameter M can represent a calculated hash value, and the remitter can generate a linkable ring signature for the hash value M. Certainly, the remitter can also directly generate a linkable ring signature for the entire transaction content, which may result in a larger calculation amount.

Figure 5:
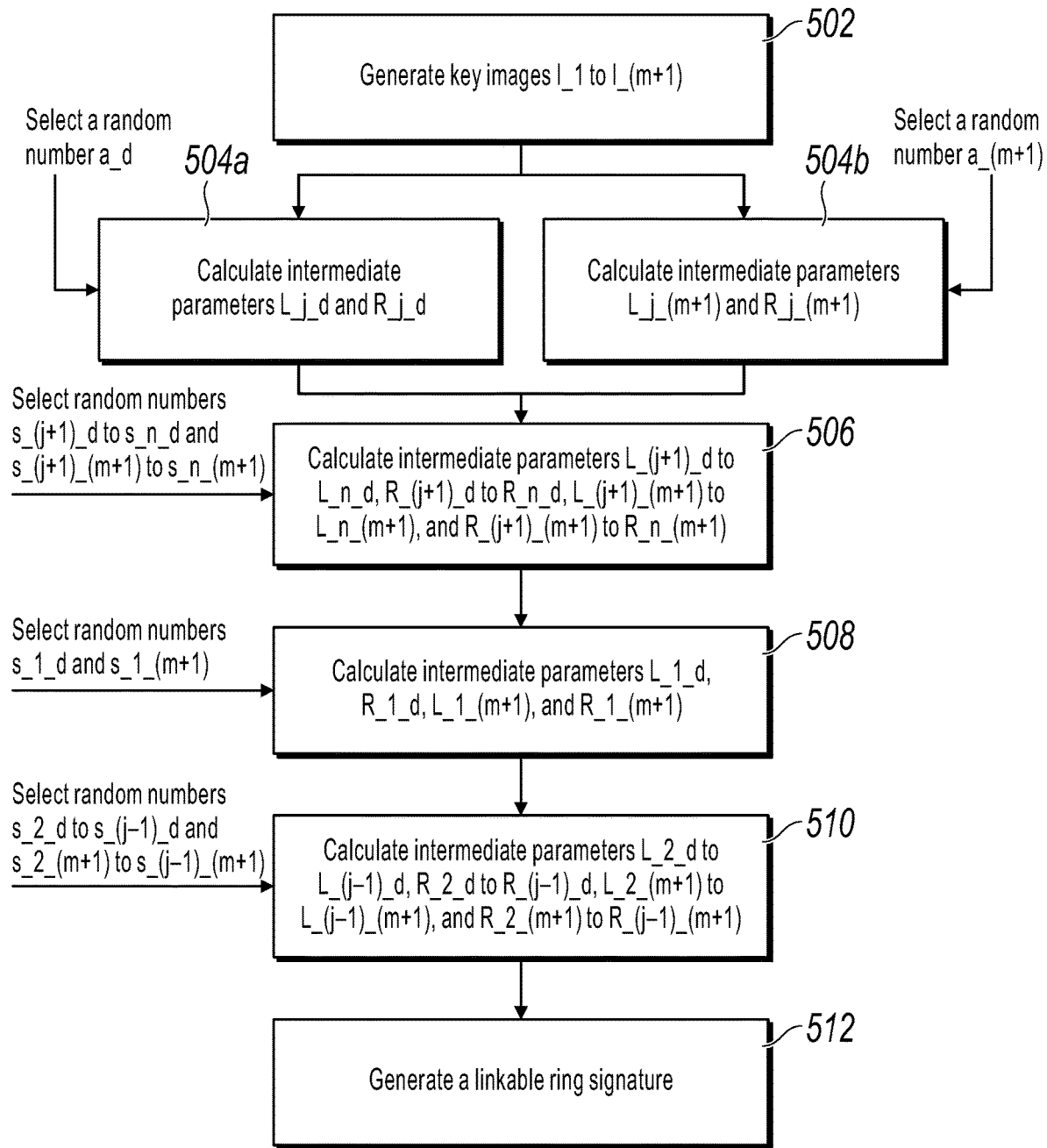
FIG. 5 is a flowchart illustrating linkable ring signature generation, according to an example implementation.

The following describes a process of generating the linkable ring signature with reference to FIG. 5. FIG. 5 is a flowchart illustrating linkable ring signature generation, according to an example implementation. As shown in FIG. 5, the following steps can be included.

Step 502: Generate key images $I\_1$ to $I\_(m+1)$.

For a process of generating the key images $I\_1$ to $I\_(m+1)$, reference can be made to the previous content. Details are omitted here for simplicity.

$I\_d=x\_j \times \text{Hash\_G}(P\_j, ID\_j\_d)$, where $d \in [1, m]$; and
$I\_(m+1)=r'' \times \text{Hash\_G}(P''\_j)$.

Step 504a: Calculate intermediate parameters $L\_j\_d$ and $R\_j\_d$.

The remitter can select a random number $a\_d$ (that is, $a\_1$ to $a\_m$) from the number field $Z\_q$, and calculate the intermediate parameters $L\_j\_d$ and $R\_j\_d$ based on the following equations:

$$L\_j\_d = a\_d \times G; \text{ and}$$

$$R\_j\_d = a\_d \times \text{Hash\_G}(P\_j, ID\_j\_d)$$

Therefore, the remitter can calculate $L\_j\_d$ ($L\_j\_1$ to $L\_j\_m$) and $R\_j\_d$ ($R\_j\_1$ to $R\_j\_m$).

Further, the remitter can generate intermediate parameters $L\_i\_d$ and $R\_i\_d$ that correspond to the cover party i, including: generating the intermediate parameters $L\_i\_d$ and $R\_i\_d$ respectively based on values of the intermediate parameters $L\_j\_d$ and $R\_j\_d$. Details are described in the following steps 506 to 510.

Step 504b: Calculate intermediate parameters $L\_j\ (m+1)$ and $R\_j\ (m+1)$.

The remitter can select a random number $a\ (m+1)$ from the number field $Z\_q$, and calculate the intermediate parameters $L\_j\ (m+1)$ and $R\_j\ (m+1)$ based on the following equations:

$$L\_j\_(m+1) = a\_(m+1) \times G; \text{ and}$$

$$R\_j\_(m+1) = a\_(m+1) \times \text{Hash\_G}(P''\_j)$$

Therefore, the remitter can calculate $L\_j\_(m+1)$ and $R\_j\_(m+1)$. Further, the remitter can generate intermediate parameters $L\_i\_(m+1)$ and $R\_i\_(m+1)$ that correspond to the cover party i. Details are described in the following steps 506 to 510.

Step 506: Calculate intermediate parameters $L\_(j+1)\_d$ to $L\_n\_d$, $R\_(j+1)\_d$ to $R\_n\_d$, $L\_(j+1)\_(m+1)$ to $L\_n\_(m+1)$, and $R\_(j+1)\_(m+1)$ to $R\_n\_(m+1)$.

When $i = j+1$ to $n$, a calculation process of the intermediate parameters $L\_i\_d$ and $R\_i\_d$ satisfies the following equations:

$$L\_i\_d = (s\_i\_d \times G + c\_i \times P\_i) \bmod p; \text{ and}$$

$$R\_i\_d = [s\_i\_d \times \text{Hash\_G}(P\_i, ID\_i\_d) + c\_i \times I\_d] \bmod p$$

In addition, a calculation process of the intermediate parameters $L\_i\_(m+1)$ and $R\_i\_(m+1)$ satisfies the following equations:

$$L\_i\_(m+1) = [s\_i\_(m+1) \times G + c\_i \times P''\_i] \bmod p; \text{ and}$$

$$R\_i\_(m+1) = [s\_i\_(m+1) \times \text{Hash\_G}(P''\_i) + c\_i \times I\_(m+1)] \bmod p$$

$s\_(j+1)\_d$ to $s\_n\_d$ and $s\_(j+1)\_(m+1)$ to $s\_n\_(m+1)$ are involved in the calculation process, which are all random numbers in the number field $Z\_q$. In addition, $c\_(j+1)$ to $c\_n$ are involved in the calculation process, and the calculation process satisfies the following equation: $c\_i = \text{Hash}[M, L\_(i-1)\_1, R\_(i-1)\_1, \ldots, L\_(i-1)\_(m+1), R\_(i-1)\_(m+1)]$, where Hash( ) is a hash function from the previous elliptic curve to the number field Z_q.

When L_j_d, R_j_d, L_j_(m+1), and R_j_(m+1) are calculated in step 504a and 504b, the intermediate parameters L_i_d and R_i_d in a case of i∈[j+1, n], that is, the previous L_(j+1_ to L_n_d and R_(j+1)_d to R_n_d, can be calculated based on L_j_d and R_j_d. Specifically, c_(j+1) can be first calculated based on the values of L_j_d, R_j_d, L_j_(m+1), and R_j_(m+1): c_(j+1)=Hash[M, L_j_1, R_j_1, . . . , L_j_(m+1), R_j_(m+1)], and L_(j+1) d and R_(j+1)_d can be calculated based on the random number s_(j+1)_d and the calculated c_(j+1). That is, L_(j+1)_1 and R_(j+1)_1 can be calculated based on a random number s_(j+1)_1 and the calculated c_(j+1), L_(j+1)_2 and R_(j+1)_2 can be calculated based on a random number s_(j+1)_2 and the calculated c_(j+1), L_(j+1)_m and R_(j+1)_m can be calculated based on a random number s_(j+1)_m and the calculated c_(j+1). Then, c_(j+2) can be calculated based on values of L_(j+1)_d and R_(j+1) d, and L_(j+2)_d and R_(j+2)_d can be calculated based on a random number s_(j+2)_d and the calculated c_(j+2), by analogy until L_n_d and R_n_d can be calculated.

Similarly, for c_i and the key image I_(m+1) calculated based on the random number s_i_(m+1) and the pseudo public key P"_i, the intermediate parameters L_(j+1)_(m+1) to L_n_(m+1) and R_(j+1)_(m+1) to R_n_(m+1) can be calculated based on the previous equations. Details are omitted here for simplicity.

Step 508: Calculate intermediate parameters L_1_d, R_1_d, L_1_(m+1), and R_1_(m+1).

A calculation process of the intermediate parameters L_1_d and R_1_d satisfies the following equations:

$$L\_1\_d = (s\_1\_d \times G + c\_1 \times P\_1) \bmod p; \text{ and}$$

$$R\_1\_d = (s\_1\_d \times \text{Hash}\_G(P\_1, ID\_1\_d) + c\_1 \times I\_d) \bmod p$$

A calculation process of the intermediate parameters L_1_(m+1) and R_1_(m+1) satisfies the following equations:

$$L\_1\_(m+1) = [s\_1\_(m+1) \times G + c\_1 \times P"\_1] \bmod p; \text{ and}$$

$$R\_1\_(m+1) = [s\_1\_(m+1) \times \text{Hash}\_G(P\_1) + c\_1 \times I\_(m+1)] \bmod p$$

s_1_d and s_1 (m+1) are both random numbers in the number field Z_q, and c_1=Hash[M, L_n_1, R_n_1, . . . , L_n_(m+1), R_n_(m+1)]. As a ring value determining rule is satisfied between the intermediate parameters, although the intermediate parameters are expressed as L_1_d to L_n_d, R_1_d to R_n_d, L_1_(m+1) to L_n_(m+1), and R_1_(m+1) to R_n_(m+1) for ease of description, L_1_d, R_1_d, L_1_(m+1), and R_1_(m+1) are not ranked in the first places, and L_n_d, R_n_d, L_n_(m+1), and R_n_(m+1) are not ranked in the last places. Actually, it should be considered that L_1_d is adjacent to L_n_d, R_1_d is adjacent to R_n_d, L_1_(m+1) is adjacent to L_n_(m+1), and R_1_(m+1) is adjacent to R_n_(m+1). Therefore, when c_1=Hash[M, L_n_1, R_n_1, . . . , L_n_(m+1), R_n_(m+1)], c_i=Hash[M, L_(i−1)_1, R_(i−1)_1, . . . , L_(i−1)_(m+1), R_(i−1)_(m+1)] described in step 506 is substantially satisfied, that is, calculation equations for c_1 and c_(j+1) to c_n are consistent.

Step 510: Calculate intermediate parameters L_2_d to L_(j−1) d, R_2_d to R_(j−1)_d, L 2 (m+1) to L_(j−1)_(m+1), and R_2 (m+1) to R_(j−1)_(m+1).

When i=2 to j−1, a calculation process of the intermediate parameters L_i_d and R_i_d satisfies the following equations:

$$L\_i\_d = (s\_i\_d \times G + c\_i \times P\_i) \bmod p; \text{ and}$$

$$R\_i\_d = (s\_i\_d \times \text{Hash}\_G(P\_i, ID\_i\_d) + c\_i \times I\_d) \bmod p$$

In addition, a calculation processes of the intermediate parameters L_i_(m+1) and R_i_(m+1) satisfies the following equations:

$$L\_i\_(m+1) = [s\_i\_(m+1) \times G + c\_i \times P"\_i] \bmod p; \text{ and}$$

$$R\_i\_(m+1) = [s\_i\_(m+1) \times \text{Hash}\_G(P"\_i) + c\_i \times I\_(m+1)] \bmod p$$

s_2_d to s_(j−1)_d and s_2_(m+1) to s_(j−1)_(m+1) involved in the calculation process are all random numbers in the number field Z_q. In addition, c_2 to c_(j−1) are involved in the calculation process. A calculation process of c_2 to c_(j−1) satisfies the following equation: c_i=Hash(M, L_(i−1)_1, R_(i−1)_1, . . . , L_(i−1)_(m+1), R_(i−1)_(m+1)).

Therefore, when L_1_d, R_1_d, L_1_(m+1), and R_1_(m+1) are calculated in step 508, the intermediate parameters L_i_d and R_i_d in a case of i∈[2, j−1], that is, L_2_d to L_(j−1)_d and R_2_d to R_(j−1)_d described above, can be calculated based on L_1_d, R_1_d, L_1_(m+1), and R_1_(m+1). Specifically, c2 is first calculated based on values of L_1_d, R_1_d, L_1_(m+1), and R_1_(m+1), and L_2_d and R_2_d are calculated based on a random number s_2_d and the calculated c2. That is, L_2_1 and R_2_1 are calculated based on a random number s_2_1 and the calculated c2, L_2_2 and R_2_2 are calculated based on a random number s_2_2 and the calculated c2, . . . , and L_2_m and R_2_m are calculated based on a random number s_2_m and the calculated c_2. Then, c3 is calculated based on values of L_2_d and R_2_d, and L_3_d and R_3_d are calculated based on a random number s_3_d and the calculated c3, by analogy until L_(j−1)_d and R_(j−1)_d are calculated.

Similarly, for c_i and the key image I_(m+1) calculated based on the random number s_i_(m+1) and the pseudo public key P"_i, the intermediate parameters L_2_(m+1) to L_(j−1)_(m+1) and R_2_(m+1) to R_(j−1)_(m+1) can be calculated based on the previous equations. Details are omitted here for simplicity.

Step 512: Generate a ring signature.

Based on a processing process of the previous step, the key images I_1 to I_(m+1), c_1, s_1_d to s_(j−1) d, s_(j+1)_d to s_n_d, s_1 (m+1) to s_(j−1)_(m+1), and s_(j+1)_(m+1) to s_n_(m+1) can be obtained, and s_j_d and s_j_(m+1) need to be calculated by a signer based on the following equations:

$$s\_j\_d = (a\_d − c\_j \times x\_j) \bmod p;$$

$$s\_j\_(m+1) = (a\_(m+1) − c\_j \times r") \bmod p; \text{ and}$$

$$c\_j = \begin{cases} \text{Hash}[M, L\_n\_1, R\_n\_1, \ldots\ldots, L\_n\_(m+1), R\_n\_(m+1)], & j = 1 \\ \text{Hash}[M, L\_(j−1)\_1, R\_(j−1)\_1, \ldots\ldots, L\_(j−1)\_(m+1), R\_(j−1)\_(m+1)], & j \in [2, n] \end{cases}$$

Although there are two cases for a value of c_j in the previous equations, a value of the parameter_j is actually fixed, for example, the value of the parameter_j is fixed to 1 or a particular value in [2, n]. Such implementation should be distinguished from the implementations for the previous parameters i and e (the parameter i has n−1 values, which are respectively 1 to j−1 and j+1 to n, and the parameter e has m values, which are respectively 1 to m). In addition, similar to the previous description of c_1, as a ring value determining rule is satisfied between the intermediate parameters, although the intermediate parameters are expressed as L_1_d to L_n_d, R_1_d to R_n_d, L_1_(m+1) to L_n_(m+1), and R_1_(m+1) to R_n_(m+1) for ease of description, L_1_d, R_1_d, L_1_(m+1), and R_1_(m+1) are not ranked in the first places, and L_n_d, R_n_d, L_n_(m+1), and R_n_(m+1) are not ranked in the last places. Actually, it should be considered that L_1_d is adjacent to L_n_d, R_1_d is adjacent to R_n_d, L_1_(m+1) is adjacent to L_n_(m+1), and R_1_(m+1) is adjacent to R_n_(m+1). Therefore, when c_1=Hash(M, L_n_1, R_n_1, ... , L_n_(m+1), R_n_(m+1)), c_j=Hash(M, L_(j−1)_1, R_(j−1)_1, . . . , L_(j−1)_(m+1), R_(j−1)_(m+1)) is substantially satisfied.

Therefore, the remitter can generate a ring signature [I_1, . . . , I_(m+1), c_1, s_1_1, . . . , s_1_(m+1), . . . , s_n_1, . . . , s_n_(m+1)], where includes the key images I_1 to I_(m+1), the random numbers s_i_1 to s_i_(m+1), the derived value s_j_1 to s_j_(m+1), and c_1.

Figure 6:
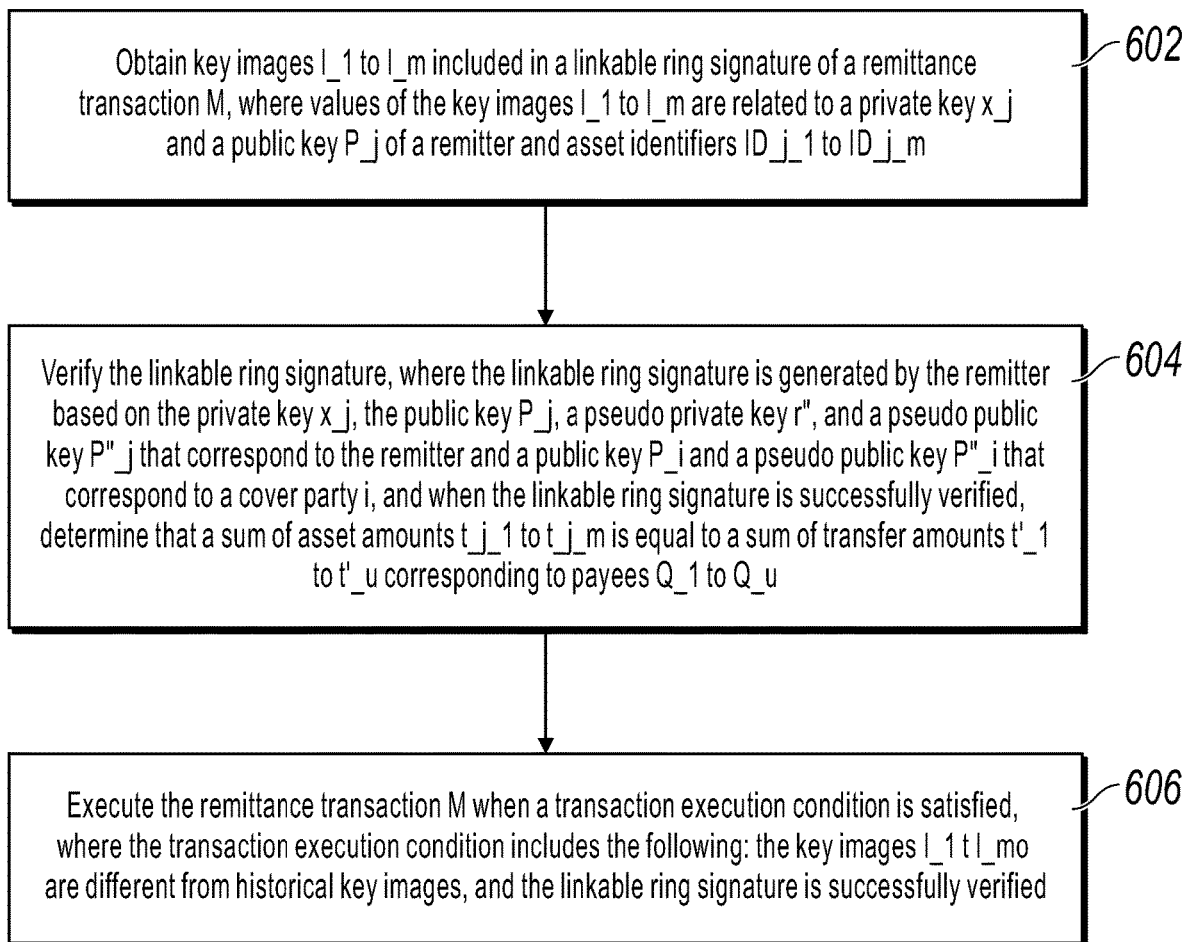
FIG. 6 is a flowchart illustrating another method for implementing a confidential transaction in a blockchain, according to an example implementation.

FIG. 6 is a flowchart illustrating another method for implementing a confidential transaction in a blockchain, according to an example implementation. As shown in FIG. 6, the method is applied to a blockchain node. The blockchain node verifies the link ring signature generated in the implementation shown in FIG. 3, and performs other necessary verification operations on the remittance transaction M, including the following steps.

Step 602: Obtain key images I_1 to I_m included in a linkable ring signature of the remittance transaction M, where values of the key images I_1 to I_m are related to a private key x_j and a public key P_j of a remitter and asset identifiers ID_j_1 to ID_j_m.

The asset identifiers ID_j_1 to ID_j_m correspond to assets [ID_j_1, PC(t_j_1, r_j_1)] to [ID_j_m, PC(t_j_m, rj_m)] held by the remitter, t_j_1 to t_j_m are asset amounts, r_j_1 to r_j_m are random numbers, and PC(t_j_1, r_j_1) to PC(t_j_m, r_j_m) are asset commitments. Certainly, the blockchain node maintains only the asset identifiers and the asset commitments that correspond to the assets, and does not directly maintain the plaintext asset amounts and random numbers. Only the remitter can know the asset amounts and the random numbers of the assets held by the remitter, and other users cannot determine the asset amounts and the random numbers, so as to hide the asset information.

As described above, the remitter maintains only one public/private key pair, that is, the private key and the public key P_j. However, by introducing the asset identifiers ID_j_1 to ID_j_m, it can be ensured that the generated key images I_1 to I_m are different from each other, and correspond to the assets one to one. The key images can be used to check whether a "double spending" problem exists in the corresponding assets. For example, I_d=x_j×Hash_G (P_j, ID_j_d), where d∈[1, m]. Correspondingly, the blockchain node can store key images included in all spent transactions, that is, historical key images. In addition, the blockchain node can compare the key images I_1 to I_m with the historical key images: If same historical key images exist, it indicates that a corresponding asset has been spent, and the "double spending" problem exists. If same historical key images do not exist, it indicates that a corresponding asset is to be spent.

The linkable ring signature can further include a key image I_(m+1), where the key image is generated by the remitter based on a pseudo private key r″ and a pseudo public key P″_j that correspond to the remitter and a pseudo public key P″_i corresponding to a cover party i, for example, I_(m+1)=r″×Hash_G(P″_j). As described above, the key image I_(m+1) corresponds to a corresponding transaction one to one. Therefore, the key image I_(m+1) can be compared with historical key images, so as to identify a replay problem for the remittance transaction M: If the key image I_(m+1) is the same as a historical key image, it indicates that the remittance transaction M is replayed.

Step 604: Verify the linkable ring signature, where the linkable ring signature is generated by the remitter based on the private key x_j, the public key P_j, a pseudo private key r″, and a pseudo public key P″_j that correspond to the remitter and a public key P_i and a pseudo public key P″_i that correspond to a cover party i, and when the linkable ring signature is successfully verified, determine that a sum of asset amounts t_j_1 to t_j_m is equal to a sum of transfer amounts t′_1 to t′_u corresponding to payees Q_1 to Q_u.

The pseudo public key corresponding to the remitter is P″_j=[PC(t_j_1, r_j_1)+ . . . +PC(t_j_m, r_j_m)]−[PC(t′_1, r′_1)+ . . . +PC(t′_u, r′_u)], and the pseudo private key corresponding to the remitter is r″=(r_j_1+ . . . +r_j_m)−(r′1+ . . . +r′_u). In addition, the remitter can calculate the pseudo public key P″_i=[PC{i, 1}+ . . . +PC{i, m}]−[PC (t′_1, r′_1)+ . . . +PC(t′_u, r′_u)] corresponding to the cover party i based on assets [ID_i_1, PC{i, 1}] to [ID_i_m, PC{i, m}] held by the cover party i, where i∈[1, j−1]∪[j+1, n]. PC(t′_1, r′_1) to PC(t′_u, r′_u) are transfer amount commitments, and r′_1 to r′_u are random numbers.

For a process of generating the linkable ring signature, reference can be made to the implementations shown in FIG. 3 and FIG. 5. Details are omitted here for simplicity.

As described above, verifying the linkable ring signature can efficiently and compactly implement the following two verification functions: On one hand, the pseudo public key P″_j and the pseudo private key r″ satisfy P″_j=r″×G, and the pseudo public key P″_i and the pseudo private key r″ satisfy P″_i≠r″×G. Therefore, when the linkable ring signature is generated based on the pseudo private key r″ and the pseudo public keys P″_j and P″_i, if the linkable ring signature is successfully verified, it can be proved that a value of a certain pseudo public key in pseudo public keys (P″_1, . . . , P″_n) equals r″×G. In addition, the pseudo public key corresponds to the previously described t″=0, so that an inward remittance amount of the remittance transaction M is equal to an outward remittance amount of the remittance transaction M. On the other hand, when the linkable ring signature is generated based on the private key x_j and the public key P_j that correspond to the remitter and the public key P_i corresponding to the cover party i, if the linkable ring signature is successfully verified, it can be proved that the linkable ring signature is obtained through signing by using a private key corresponding to a certain public key in public keys (P_1, . . . , P_n), so that identity verification can be completed without exposing an identity of the remitter.

Step 606: Execute the remittance transaction M when a transaction execution condition is satisfied, where the transaction execution condition includes the following: the key images I_1 to I_m are different from historical key images, and the linkable ring signature is successfully verified.

As described above, the linkable ring signature can further include the key image I_(m+1). Correspondingly, the transaction execution condition can further include the following: The key image I_(m+1) is different from historical key images.

When the remitter corresponds to the public key P_j and the cover party i corresponds to the public key P_i, the transaction execution condition can further include the following: An asset ID_k_d belongs to a holder of a public key P_k, where k∈[1, n], and d∈[1, m]. In other words, the blockchain node can verify ownership of each asset.

Figure 7:
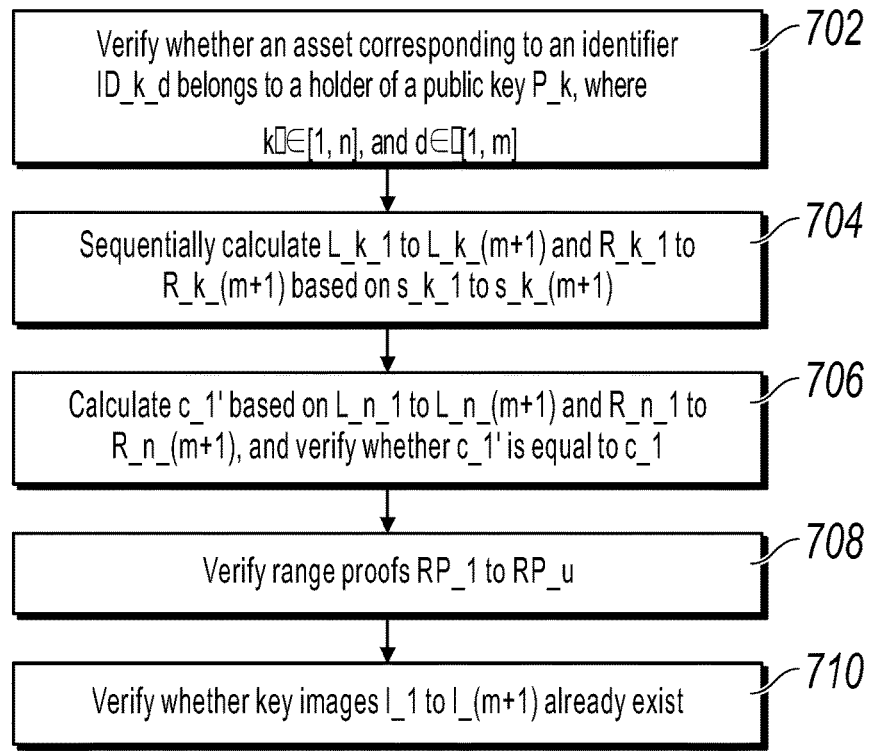
FIG. 7 is a flowchart illustrating linkable ring signature verification, according to an example implementation.

In a confidential transaction, an inward remittance amount needs to be equal to an outward remittance amount. Besides, some other proof information is further needed. For example, it needs to be proved that the transfer amounts t'_1 to t'_u in the remittance transaction M each are not less than 0. The transfer amount commitments PC(t'_1, r'_1) to PC(t'_u, r'_u) are generated by the remitter based on the transfer amounts t'_1 to t'_u, the random numbers r'_1 to r'_u, and the transfer amounts t'_1 to t'_u and the random numbers r'_1 to r'_u are known only by the remitter and the payees Q_1 to Q_u. Therefore, a verifier needs to perform a verification operation by using range proofs RP_1 to RP_u included in the remittance transaction M, to determine whether the transfer amounts t'_1 to t'_u satisfy t'_1≥0 to t'_u≥0. Then, the transaction execution condition can further include the following: All transfer amounts are not less than 0. The following describes a process of verifying the linkable ring signature with reference to FIG. 7. FIG. 7 is a flowchart illustrating linkable ring signature verification, according to an example implementation. As shown in FIG. 7, the following steps can be included.

Step 702: Verify whether an asset corresponding to an identifier ID_k_d belongs to a holder of a public key P_k, where k∈[1, n], and d∈[1, m].

The verifier can be a blockchain node in the blockchain network. After receiving the remittance transaction M submitted by the remitter, the blockchain node can verify the ring signature of the remittance transaction M. Similarly, each blockchain node receives the remittance transaction M and implements verification as a verifier. The remittance transaction M can be sent by a client device to a verifier, or received by a certain verifier from a client device and then forwarded to another verifier, or received by a certain verifier from another verifier and then forwarded to still another verifier.

As a blockchain node, the verifier maintains a full blockchain ledger, so that the verifier can determine an asset holding status of each user. The remittance transaction M involves the asset ID_k_d held by user k (corresponding to the public key P_k), and the verifier can separately verify, based on a maintained asset holding status, whether a mapping relationship between each public key P_k and a corresponding asset ID_k_d is established, that is, whether a holder of the public key P_k holds m assets corresponding to the identifier ID_k_d. If the mapping relationship between each public key P_k and the identifier ID_k_d in a corresponding array is established, a subsequent step can be continued. If an asset corresponding to a certain identifier does not belong to the holder of the public key P_k, the verifier can determine that the remittance transaction M is invalid and there is no need to continue subsequent steps 704 to 708.

Step 704: Sequentially calculate L_k_1 to L_k_(m+1) and R_k_1 to R_k_(m+1) based on s_k_1 to s_k_(m+1).

Step 706: Calculate c_1' based on L_n_1 to L_n_(m+1) and R_n_1 to R_n_(m+1), and verify whether c_1' is equal to c_1.

The verifier can calculate intermediate parameters L_j_d, R_j_d, L_j_(m+1), R_j_(m+1), L_i_d, R_i_d, L_i_(m+1), and R_i_(m+1) based on the random numbers and/or their derived numerical values included the ring signature, so as to verify whether a ring value determining rule is satisfied between the intermediate parameters L_j_d and L_i_d, whether a ring value determining rule is satisfied between the intermediate parameters R_j_d and R_i_d, whether a ring value determining rule is satisfied between the intermediate parameters L_j_(m+1) and L_i_(m+1), and whether a ring value determining rule is satisfied between the intermediate parameters R_j_(m+1) and R_i_(m+1).

For example, when the random numbers and/or their derived numerical values included the ring signature include s_1_1 to s_1_(m+1), . . . , s_n_1 to s_n_(m+1), and c_1, the ring value determining rule between the intermediate parameters L_j_d and L_i_d can include the following:

$$L\_k\_d = (s\_k\_d \times G \times c\_k \times P\_k) \bmod p, \text{ where } h \in [1, n];$$
and $$c\_k = \begin{cases} \text{Hash}[M, L\_n\_1, R\_n\_1, \ldots\ldots, L\_n\_(m+1), R\_n\_(m+1)], k = 1 \\ \text{Hash}[M, L\_(j-1)\_1, R\_(j-1)\_1, \ldots\ldots, L\_(j-1)\_(m+1), \\ R\_(j-1)\_(m+1)], k \in [2, n] \end{cases}$$

The ring value determining rule between the intermediate parameters L_j_(m+1) and L_i_(m+1) can include the following:

$$L\_k\_(m+1) = [s\_k\_(m+1) \times G \times c\_k \times P'''\_k] \bmod p$$

The ring value determining rule between the intermediate parameters R_j_d and R_i_d can include the following:

$$R\_k\_d = [s\_k\_d \times \text{Hash}\_G(P\_k, ID\_k\_d) + c\_k \times I\_d] \bmod p$$

The ring value determining rule between the intermediate parameters R_j_(m+1) and R_i_(m+1) can include the following:

$$R\_k\_(m+1) = [s\_k\_(m+1) \times \text{Hash}\_G(P'''\_k) + c\_k \times I\_(m+1)] \bmod p$$

Then, the verifier can first generate L_1_d, that is, L_1_1 to L_1_m based on s_1_d, c_1, G, P_1, and p, and generate R_1_d, that is, R_1_1 to R_1_m based on s_1_d, c_1, P_1, ID_1_d, I_d, and p. Moreover, the verifier can generate L_1_(m+1) based on s_1 (m+1), c_1, G, P'''_1, and p, and generate R_1_(m+1) based on s_1 (m+1), c_1, P'''_1, I_(m+1), and p.

Then, the verifier can generate c_2 based on M, L_1_d, R_1_d, L_1_(m+1), and R_1_(m+1), generate L_2_d based on s_2_d, c_2, G, P_2, and p, generate R_2_d based on s_2_d, c_2, P_2, ID_2_d, I_d, and p, generate L_2_(m+1) based on s_2_(m+1), c_2, G, P'''_2, and p, and generate R_2_(m+1) based on s_2_(m+1), c_2, P'''_2, I_(m+1), and p, by analogy until the verifier generates c_n based on M, L_(n-1) d, R_(n-1) d, L_(n-1)_(m+1), and R_(n-1)_(m+1), generates L_n_d based on s_n_d, c_n, G, P_n, and p, generates R_n_d based on s_n_d, c_n, P_n, ID_n_d, I_d, and p, generates L_n_(m+1) based on s_n_(m+1), c_n, G, P'''_n, and p, and generates R_n_(m+1) based on s_n_(m+1), c_n, P'''_n, I_(m+1), and p.

Further, the verifier can calculate c_1'=Hash[M, L_n_1, R_n_1, . . . , L_n_(m+1), R_n_(m+1)] based on the previous calculation equation for c_k. In this case, c_1' is used to distinguish from c_1 included in the ring signature. Therefore, the verifier can compare c with c_1 included in the ring signature: If c_1' is equal to c_1, it indicates that the previous ring value determining rule is satisfied, and the following can be determined: (1) In pseudo public keys P_1 to P_n, there is a pseudo public key that makes the inward remittance amount of the remittance transaction M equal to an outward remittance amount of the remittance transaction M. (2) The ring signature is generated by using a private key corresponding to a certain public key in the public keys P_1 to P_m. If c_1' is unequal to c_1, it indicates that at least one of (1) and (2) is not established, and the remittance transaction M is determined as invalid, and the following step 708 does not need to be continued.

Step 708: Verify range proofs RP_1 to RP_u.

The verifier obtains the range proofs RP_1 to RP_u from transaction content of the remittance transaction M and perform verification, to determine whether all of the corresponding transfer amounts t'_1 to t'_u are not less than 0. If yes, step 710 is performed; otherwise, the remittance transaction M is determined as invalid, and the following step 710 does not need to be performed.

Step 710: Verify whether key images I_1 to I_(m+1) already exist.

In an implementation, the verifier can compare the key images I_1 to I_(m+1) with historical key images, so as to determine whether the key images I_1 to I_(m+1) already exist. If a corresponding historical key image exists for any of the key images I_1 to I_(m+1), it can be determined that the remittance transaction M is invalid. If none of the key images I_1 to I_(m+1) has a corresponding historical key image, it can be determined that the remittance transaction M is valid, and the remittance transaction M can be executed to complete the remittance operation.

Figure 8:
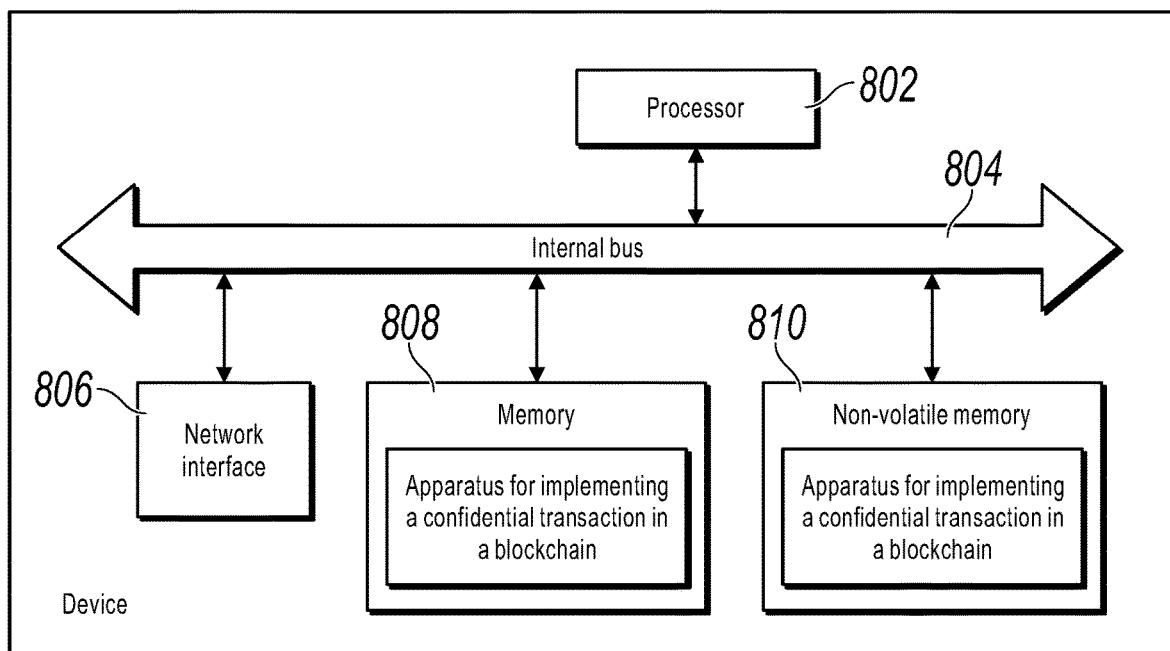
FIG. 8 is a schematic structural diagram illustrating a device, according to an example implementation.

FIG. 8 is a schematic structural diagram illustrating a device, according to an example implementation. Referring to FIG. 8, in terms of hardware, the device includes a processor 802, an internal bus 804, a network interface 806, a memory 808, and a non-volatile memory 810, and certainly can further include hardware needed by other services. The processor 802 reads a corresponding computer program from the non-volatile memory 810 to the memory 808 for running, and an apparatus for implementing a confidential transaction in a blockchain is logically formed. Certainly, in addition to a software implementation method, one or more implementations of the present application do not exclude other implementation methods, for example, a logic device or a combination of hardware and software. That is, an execution body of the following processing procedure is not limited to each logical unit, and can also be hardware or a logic device.

Figure 9:
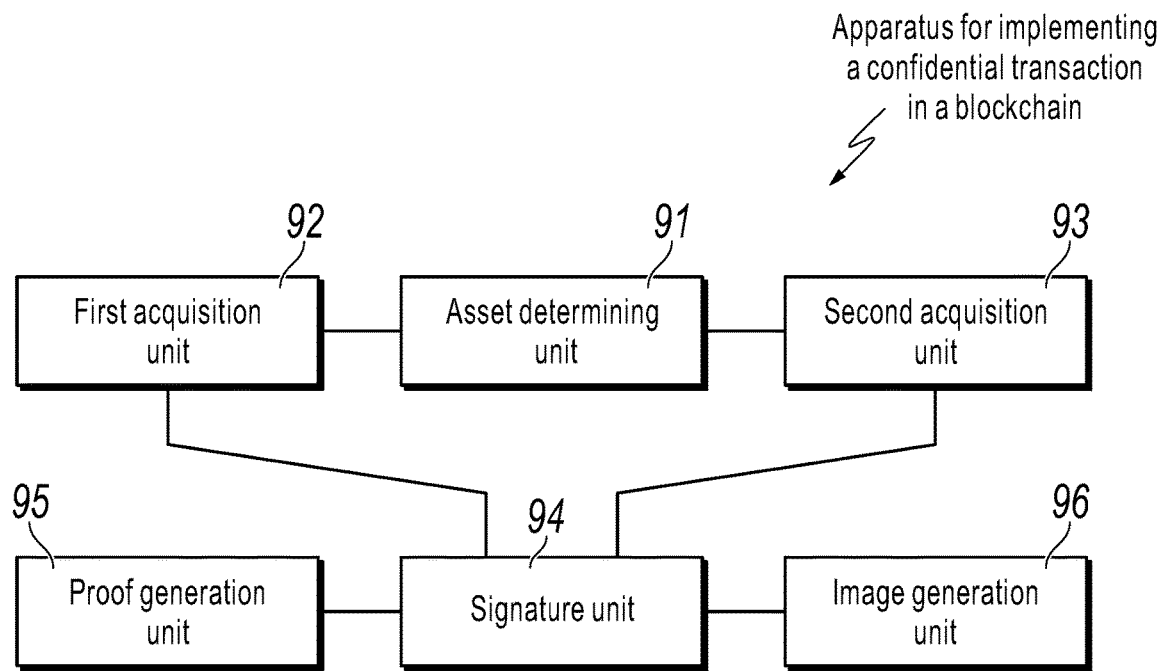
FIG. 9 is a block diagram illustrating an apparatus for implementing a confidential transaction in a blockchain, according to an example implementation.

Referring FIG. 9, in a software implementation method, the apparatus for implementing a confidential transaction in a blockchain can include the following: an asset determining unit 91, configured to determine m pieces of assets to be spent [ID_j_1, PC(t_j_1, r_j_1)] to [ID_j_m, PC(t_j_m, r_j_m)] held by a remitter for a remittance transaction M between the remitter and a payee, where ID_j_1 to ID_j_m are asset identifiers, t_j_1 to t_j_m are asset amounts, r_j_1 to r_j_m are random numbers, and PC(t_j_1, r_j_1) to PC(t_j_m, r_j_m) are asset commitments; a first acquisition unit 92, configured to obtain a pseudo public key P'''_j=[PC(t_j_1, r_j_1)+ . . . +PC(t_j_m, r_j_m)]−[PC(t'_1, r'_1)+ . . . +PC(t'_u, r'_u)] corresponding to the remitter and a pseudo private key r''=(r_j_1+ . . . +r_j_m)−(r'_1+ . . . +r'_u) corresponding to the remitter based on transfer amounts t'_1 to t'_u corresponding to payees Q_1 to Q_u, where PC(t'_1, r'_1) to PC(t'_u, r'_u) are transfer amount commitments, r'_1 to r'_u are random numbers, and u≥1; a second acquisition unit 93, configured to obtain a pseudo public key P'''_i=[PC{i, 1}+ . . . +PC{i, m}]−[PC(t'_1, r'_1)+ . . . +PC(t'_u, r'_u)] corresponding to a selected cover party i based on m assets [ID_i_1, PC{i, 1}] to [ID_i_m, PC{i, m}] held by the cover party i, where i∈[1, j−1]∪[j+1, n]; and a signature unit 94, configured to generate a linkable ring signature for the remittance transaction M based on a private key x_j, a public key P_j, the pseudo private key r'', and the pseudo public key P'''_j that correspond to the remitter and a public key P_i and the pseudo public key P'''_i that correspond to the cover party i, where the linkable ring signature includes key images I_1 to I_m, and values of the key images I_1 to I_m are related to the private key x_j and the public key P_j of the remitter and the asset identifiers ID_j_1 to ID_j_m.

Optionally, the apparatus for implementing a confidential transaction in a blockchain further includes the following: a proof generation unit 95, configured to generate range proofs RP_1 to RP_u corresponding to the transfer amounts t'_1 to t'_u, and adding the range proofs RP_1 to RP_u to the remittance transaction M, where the range proofs RP_1 to RP_u are used to prove t'_1≥0 to t'_u≥0.

Optionally, the key images I_1 to I_m can be calculated by using the following equation: I_d=x_j×Hash_G(P_j, ID_j_d), where d∈[1, m]; where Hash_G( ) is a hash function from an elliptic curve to the elliptic curve itself.

Optionally, the apparatus for implementing a confidential transaction in a blockchain further includes the following: an image generation unit 96, configured to generate a key image I_(m+1)=r''×Hash_G(P'''_j) based on the pseudo private key r'' and the pseudo public key P'''_j that correspond to the remitter, where the linkable ring signature further includes the key image I_(m+1).

Optionally, the assets to be spent [ID_j_1, PC(t_j_1, r_j_1)] to [ID_j_m, PC(t_j_m, r_j_m)] and the assets [ID_i_1, PC{i, 1}] to [ID_i_m, PC{i, m}] are transaction outputs of corresponding historical transactions; or the assets to be spent [ID_j_1, PC(t_j_1, r_j_1)] to [ID_j_m, PC(t_j_m, r_j_m)] are generated by dividing an account balance corresponding to the remitter, and the assets [ID_i_1, PC{i, 1}] to [ID_i_m, PC{i, m}] are generated by dividing an account balance corresponding to the cover party i.

Optionally, the signature unit 94 is specifically configured to: separately generate intermediate parameters L_j_d, R_j_d, L_j_(m+1), and R_j_(m+1) that correspond to the remitter and intermediate parameters L_i_d, R_i_d, L_i_(m+1), and R_i_(m+1) that correspond to the cover party i, where d∈[1, m], a ring value determining rule is satisfied between the intermediate parameters L_j_d and L_i_d, a ring value determining rule is satisfied between the intermediate parameters L_j_(m+1) and L_i_(m+1), a ring value determining rule is satisfied between the intermediate parameters R_j_d and R_i_d, a ring value determining rule is satisfied between the intermediate parameters R_j_(m+1) and R_i_(m+1), and values of the intermediate parameters L_j_d, R_j_d, L_j_(m+1), R_j_(m+1), L_i_d, R_i_d, L_i_(m+1), and R_i_(m+1) are related to at least one selected random number and/or its derived numerical value; and generate the linkable ring signature for the remittance transaction M based on the selected random number and/or its derived numerical value.

Optionally, P_j=x_j×G, where G is a basis point of an elliptic curve, |G|=p and p is a prime number, and 0<x_j<p; the generating intermediate parameters L_j_d and R_j_d that correspond to the remitter includes the following: calculating the intermediate parameters L_j_d and R_j_d based on a random number a_d selected from a number field Z_q of the elliptic curve, so that L_j_d=a_d×G and R_j_d=a_d×Hash_G(P_j, ID_j_d), where Hash_G( ) is a hash function from the elliptic curve to the elliptic curve itself; the generating intermediate parameters L_j_(m+1) and R_j_(m+1) that correspond to the remitter includes the following: calculating the intermediate parameters L_j_(m+1) and R_j_

(m+1) based on a random number $a\_(m+1)$ selected from the number field $Z\_q$ of the elliptic curve, so that $L\_j\_(m+1) = a\_(m+1) \times G$ and $R\_j\_(m+1) = a\_(m+1) \times \text{Hash\_G}(P'''\_j)$; the generating intermediate parameters $L\_i\_d, R\_i\_d, L\_i\_(m+1)$, and $R\_i\_(m+1)$ that correspond to the cover party i includes the following: generating the intermediate parameters $L\_i\_d, R\_i\_d, L\_i\_(m+1)$, and $R\_i\_(m+1)$ based on the values of the intermediate parameters $L\_j\_d$ and $R\_j\_d$, so that $L\_i\_d = (s\_i\_d \times G + c\_i \times P\_i) \mod p$, $R\_i\_d = (s\_i\_d \times \text{Hash\_G}(P\_i, ID\_i\_d) + c\_i \times I\_d) \mod p$, $L\_i\_(m+1) = [s\_i\_(m+1) \times G + c\_i \times P''' i] \mod p$, $R\_i\_(m+1) = [s\_i\_(m+1) \times \text{Hash\_G}(P'''\_i) + c\_i \times I\_(m+1)] \mod p$, $I\_d = x\_j \times \text{Hash\_G}(P\_j, ID\_j\_d)$, and $I\_(m+1) = r'' \times \text{Hash\_G}(P'''\_j)$, where $s\_i\_1$ to $s\_i\_(m+1)$ are random numbers in the number field $Z\_q$, $c\_1 = \text{Hash}(M, L\_n\_1, R\_n\_1, \ldots, L\_n\_(m+1), R\_n\_(m+1))$ when $i=1$, $c\_i = \text{Hash}(M, L\_(i-1)\_1, R\_(i-1)\,1, \ldots, L\_(i-1)\_(m+1), R\_(i-1)\_(m+1))$ when $i \in [2, j-1] \cup [j+1, n]$, and Hash( ) is a hash function from the elliptic curve to the number field $Z\_q$; and the selected random number and/or its derived numerical value include/includes random number $s\_i\_1$ to $s\_i\_(m+1)$, a derived numerical value $c\_1$, and derived numerical values $s\_j\_1$ to $s\_j\_(m+1)$, where $s\_j\_d = (a\_d - c\_j \times x\_j) \mod p$, $s\_j\_(m+1) = [a\_(m+1) - c\_j \times r''] \mod p$, and $c\_j = \text{Hash}(M, L\_n\_1, R\_n\_1, \ldots, L\_n\_(m+1), R\_n\_(m+1))$ when it is determined that a value of j is 1 or $c\_j = \text{Hash}(M, L\_(j-1)\_1, R\_(j-1)\,1, \ldots, L\_(j-1)\_(m+1), R\_(j-1)\_(m+1))$ when it is determined that the value of j falls in $[2, n]$.

Figure 10:
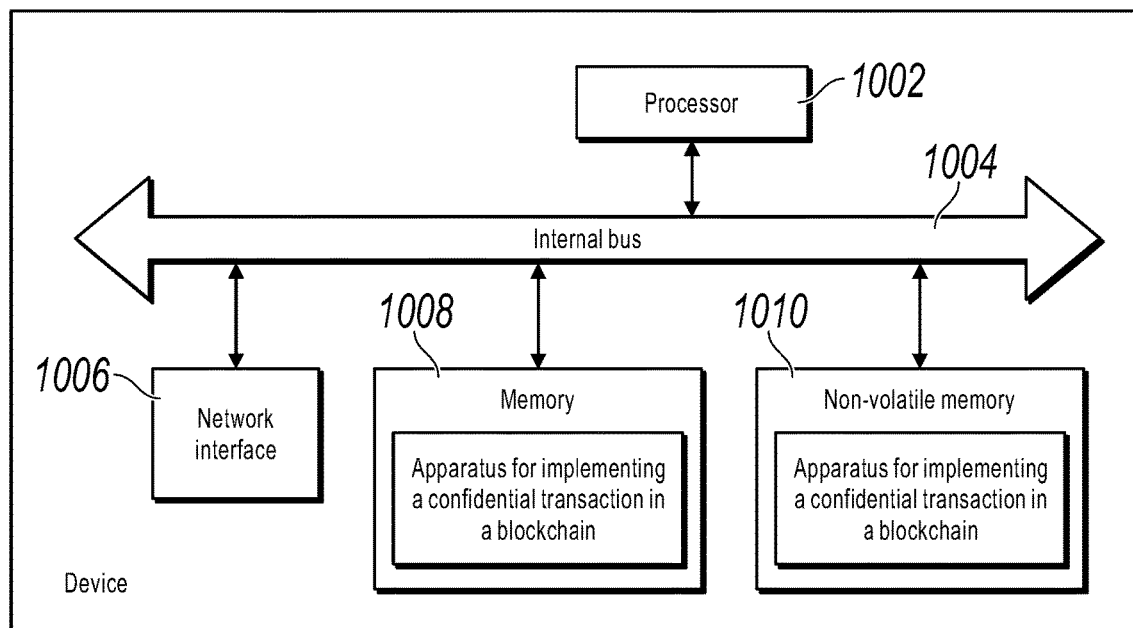
FIG. 10 is a schematic structural diagram illustrating another device, according to an example implementation.

FIG. 10 is a schematic structural diagram illustrating a device, according to an example implementation. Referring to FIG. 10, in terms of hardware, the device includes a processor 1002, an internal bus 1004, a network interface 1006, a memory 1008, and a non-volatile memory 1010, and certainly can further include hardware needed by other services. The processor 1002 reads a corresponding computer program from the non-volatile memory 1010 to the memory 1008 for running, and an apparatus for implementing a confidential transaction in a blockchain is logically formed. Certainly, in addition to a software implementation method, one or more implementations of the present application do not exclude another implementation method, for example, a logic device or a combination of hardware and software. That is, an execution body of the following processing procedure is not limited to each logical unit, and can also be hardware or a logic device.

Figure 11:
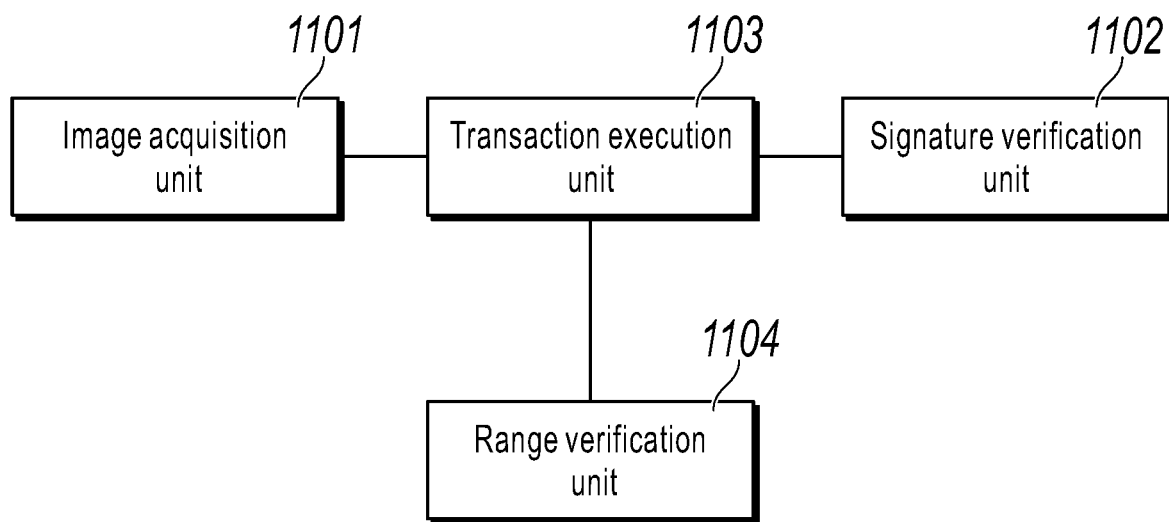
FIG. 11 is a block diagram illustrating another apparatus for implementing a confidential transaction in a blockchain, according to an example implementation.

Referring FIG. 11, in a software implementation method, the apparatus for implementing a confidential transaction in a blockchain can include the following: an image acquisition unit 1101, configured to obtain key images $I\_1$ to $I\_m$ included in a linkable ring signature of a remittance transaction M, where values of the key images $I\_1$ to $I\_m$ are related to a private key $x\_j$ and a public key $P\_j$ of a remitter and asset identifiers $ID\_j\_1$ to $ID\_j\_m$, where the asset identifiers $ID\_j\_1$ to $ID\_j\_m$ correspond to assets $[ID\_j\_1, PC(t\_j\_1, r\_j\_1)]$ to $[ID\_j\_m, PC(t\_j\_m, r\_j\_m)]$ held by the remitter, $t\_j\_1$ to $t\_j\_m$ are asset amounts, $r\_j\_1$ to $r\_j\_m$ are random numbers, and $PC(t\_j\_1, r\_j\_1)$ to $PC(t\_j\_m, r\_j\_m)$ are asset commitments; a signature verification unit 1102, configured to verify the linkable ring signature, where the linkable ring signature is generated by the remitter based on the private key $x\_j$, the public key $P\_j$, a pseudo private key $r''$, and a pseudo public key $P'''\_j$ that correspond to the remitter, and a public key $P\_i$ and a pseudo public key $P'''\_i$ that correspond to a cover party i, where when the linkable ring signature is successfully verified, it is determined that a sum of the asset amounts $t\_j\_1$ to $t\_j\_m$ is equal to a sum of transfer amounts $t'\_1$ to $t'\_u$ that correspond to payees $Q\_1$ to $Q\_u$, where $P'''\_j = [PC(t\_j\_1, r\_j\_1) + \ldots + PC(t\_j\_m, r\_j\_m)] - [PC(t'\_1, r'\_1) + \ldots + PC(t'\_u, r'\_u)]$, $r'' = (r\_j\_1 + \ldots + r\_j\_m) - (r'1 + \ldots + r'\_u)$, the cover party i holds assets $[ID\_i\_1, PC\{i, 1\}]$ to $[ID\_i\_m, PC\{i, m\}]$, $P'''\_i = [PC\{i, 1\} + \ldots + PC\{i, m\}] - [PC(t'\_1, r'\_1) + \ldots + PC(t'\_u, r'\_u)]$, $PC(t'\_1, r'\_1)$ to $PC(t'\_u, r'\_u)$ are transfer amount commitments, $r'\_1$ to $r'\_u$ are random numbers, $i \in [1, j-1] \cup [j+1, n]$, and $u \geq 1$; and a transaction execution unit 1103, configured to execute the remittance transaction M when a transaction execution condition is satisfied, where the transaction execution condition includes the following: the key images $I\_1$ to $I\_m$ are different from historical key images, and the linkable ring signature is successfully verified.

Optionally, the apparatus for implementing a confidential transaction in a blockchain further includes the following: a range verification unit 1104, configured to verify whether the transfer amounts $t'\_1$ to $t'\_u$ satisfy $t'\_1 \geq 0$ to $t'\_u \geq 0$ based on range proofs $RP\_1$ to $RP\_u$ included in the remittance transaction M, where the transaction execution condition further includes the following: satisfying $t'\_1 \geq 0$ to $t'\_u \geq 0$.

Optionally, the key images $I\_1$ to $I\_m$ can be calculated by using the following equation: $I\_d = x\_j \times \text{Hash\_G}(P\_j, ID\_j\_d)$, where $d \in [1, m]$.

Optionally, the linkable ring signature further includes a key image $I\_(m+1) = r'' \times \text{Hash\_G}(P'''\_j)$; where the transaction execution condition further includes the following: the key image $I\_(m+1)$ is different from historical key images.

Optionally, the assets to be spent $[ID\_j\_1, PC(t\_j\_1, r\_j\_1)]$ to $[ID\_j\_m, PC(t\_j\_m, r\_j\_m)]$ and the assets $[ID\_i\_1, PC\{i, 1\}]$ to $[ID\_i\_m, PC\{i, m\}]$ are transaction outputs of corresponding historical transactions; or the assets to be spent $[ID\_j\_1, PC(t\_j\_1, r\_j\_1)]$ to $[ID\_j\_m, PC(t\_j\_m, r\_j\_m)]$ are generated by dividing an account balance corresponding to the remitter, and the assets $[ID\_i\_1, PC\{i, 1\}]$ to $[ID\_i\_m, PC\{i, m\}]$ are generated by dividing an account balance corresponding to the cover party i.

Optionally, the transaction execution condition further includes the following: an asset $ID\_k\_d$ belongs to a holder of a public key $P\_k$, $k \in [1, n]$, and $d \in [1, m]$.

Optionally, the remitter separately generates, based on the private key $x\_j$, the public key $P\_j$, the pseudo private key $r''$, and the pseudo public key $P'''\_j$ that correspond to the remitter, and the public key $P\_i$ and the pseudo public key $P'''\_i$ that correspond to the cover party i, intermediate parameters $L\_j\_d, R\_j\_d, L\_j\_(m+1)$, and $R\_j\_(m+1)$ that correspond to the remitter and intermediate parameters $L\_i\_d, R\_i\_d, L\_i\_(m+1)$, and $R\_i\_(m+1)$ that correspond to the cover party i, and generates the linkable ring signature based on a random number and/or its derived numerical value related to values of the intermediate parameters $L\_j\_d, R\_j\_d, L\_j\_(m+1), R\_j\_(m+1), L\_i\_d, R\_i\_d, L\_i\_(m+1)$, and $R\_i\_(m+1)$; and the signature verification unit 1102 is specifically configured to: calculate the intermediate parameters $L\_j\_d, R\_j\_d, L\_j\_(m+1), R\_j\_(m+1), L\_i\_d, R\_i\_d, L\_i\_(m+1)$, and $R\_i\_(m+1)$ based on the random number and/or its derived numerical value included the ring signature, so as to verify whether a ring value determining rule is satisfied between the intermediate parameters $L\_j\_d$ and $L\_i\_d$, whether a ring value determining rule is satisfied between the intermediate parameters $L\_j\_(m+1)$ and $L\_i\_(m+1)$, whether a ring value determining rule is satisfied between the intermediate parameters $R\_j\_d$ and $R\_i\_d$, and whether a ring value determining rule is satisfied between the intermediate parameters $R\_j\_(m+1)$ and $R\_i\_(m+1)$.

Optionally, $P\_j = x\_j \times G$, where G is a basis point of an elliptic curve, $|G|=p$ and p is a prime number, and $0 < x\_j < p$; the random number and/or its derived numerical value included the ring signature include/includes the following: $s\_k\_1$ to $s\_k\_(m+1)$ and $c\_1$, where $k \in [1, n]$; the ring value determining rule between the intermediate parameters $L\_j\_d$ and $L\_i\_d$ includes the following: $L\_k\_d = (s\_k\_d \times G \times c\_k \times P\_k) \bmod p$, where $s\_k\_d$ belongs to a number field $Z\_q$ of the elliptic curve, and Hash( ) is a hash function from the elliptic curve to the number field $Z\_q$; the ring value determining rule between the intermediate parameters $L\_j\_(m+1)$ and $L\_i\_(m+1)$ includes the following: $L\_k\_(m+1) = [s\_k\_(m+1) \times G + c\_k \times P''\ k] \bmod p$, where $s\_k\_(m+1)$ belongs to the number field $Z\_q$; the ring value determining rule between the intermediate parameters $R\_j\_d$ and $R\_i\_d$ includes the following: $R\_k\_d = (s\_k\_d \times \text{Hash}\_G(P\_k, ID\_k\_d) + c\_k \times I\_d) \bmod p$, where $I\_d$ is included in the ring signature; and the ring value determining rule between the intermediate parameters $R\_j\_(m+1)$ and $R\_i\_(m+1)$ includes the following: $R\_k\_(m+1) = [s\_k\_(m+1) \times \text{Hash}\_G(P''\ k) + c\_k \times I\_(m+1)] \bmod p$, where $I\_(m+1)$ is included in the ring signature; where $c\_1 = \text{Hash}(M, L\_n\_1, R\_n\_1, \ldots, L\_n\_(m+1), R\_n\_(m+1))$ when $h=1$, and $c\_k = \text{Hash}(M, L\_(h-1)\_1, R\_(h-1)\_1, \ldots, L\_(h-1)\_(m+1), R\_(h-1)\_(m+1))$ when $h \in [2, n]$.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a typical configuration, a computer includes one or more processors (CPU), an input/output interface, a network interface, and a memory.

The memory may include a non-persistent memory, a random access memory (RAM), a non-volatile memory, and/or another form in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD) or another optical storage, a cassette tape, a magnetic disk storage, a quantum memory, a storage medium based on grapheme, another magnetic storage device, or any other non-transmission medium. The computer storage medium can be used to store information that can be accessed by the computing device. Based on the definition in the present specification, the computer readable medium does not include transitory computer-readable media (transitory media), for example, a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

Terms used in one or more implementations of the present specification are merely used to describe specific implementations, and are not intended to limit the one or more implementations of the present specification. The terms "a" and "the" of singular forms used in one or more implementations of the present specification and the appended claims are also intended to include plural forms, unless otherwise specified in the context clearly. It should also be understood that, the term "and/or" used here indicates and includes any or all possible combinations of one or more associated listed items.

It should be understood that although terms "first", "second", "third", etc. can be used in one or more implementations of the present specification to describe various types of information, the information is not limited to these terms. These terms are only used to differentiate between information of the same type. For example, without departing from the scope of one or more implementations of the present specification, first information can also be referred to as second information, and similarly, the second information can be referred to as the first information. Depending on the context, for example, the word "if" used here can be explained as "while", "when", or "in response to determining".

The previous descriptions are only example implementations of one or more implementations of the present specification, but are not intended to limit the one or more implementations of the present specification. Any modification, equivalent replacement, improvement, etc. made without departing from the spirit and principle of the one or more implementations of the present specification shall fall within the protection scope of the one or more implementations of the present specification.

What is claimed is:

1. A computer-implemented method, comprising:
    obtaining, by a blockchain node of a blockchain, a linkable ring signature corresponding to a remittance transaction between a remitter and one or more payees, wherein the linkable ring signature comprises a plurality of key images, wherein a value of each key image is related to a remitter public key of the remitter, a remitter private key of the remitter, and an asset commitment value of a respective asset to be spent in the remittance transaction, and
    wherein the linkable ring signature is generated based on the remitter public key, the remitter private key, a remitter pseudo private key, and a remitter pseudo public key, wherein the remitter pseudo public key is based on the asset commitment values of the assets to be spent, transfer amount commitment values of transfer amounts corresponding to respective payees of the one or more payees, and a first set of one or more random numbers, and wherein the remitter pseudo private key is based on a second set of one or more random numbers;

determining, based on the linkable ring signature, that the remitter pseudo private key and the remitter pseudo public key satisfy a key pair relationship;

determining, based on the linkable ring signature, that a sum of asset amounts of the assets to be spent equals a sum of the transfer amounts;

determining, based on the linkable ring signature, that the plurality of key images are different from historical key images corresponding to previous remittance transactions; and based on determining that the plurality of key images are different from historical key images corresponding to previous remittance transactions, executing the remittance transaction.

2. The computer-implemented method of claim 1, wherein the linkable ring signature further comprises an additional key image generated based on a public key of a cover party and a pseudo public key of the cover party, the pseudo public key of the cover party being generated based on asset commitment values of assets held by the cover party, and wherein determining that the plurality of key images are different from the historical key images comprises determining that the additional key image is different from the historical key images.

3. The computer-implemented method of claim 2, comprising:

obtaining one or more pairs of intermediate parameters, wherein a first intermediate parameter of each pair corresponds to the remitter, and wherein a second intermediate parameter of each pair corresponds to the cover party; and verifying the one or more pairs of intermediate parameters, comprising recalculating the one or more pairs of intermediate parameters based on a third set of one or more random numbers or derived values of the third set of one or more random numbers included in the linkable ring signature, and verifying, based on the recalculated one or more pairs of intermediate parameters, that a respective ring value determining rule is satisfied between first and second intermediate parameters of each pair.

4. The computer-implemented method of claim 1, wherein the key images are $I_1$ to $I_m$, the remitter public key is $P_j$, the remitter private key is $x_j$, asset identifiers of the assets to be spent are $ID_1$ to $ID_m$, and wherein the key images are generated using the following equation:

$I_d = x_j \times Hash_G(P_j, ID_{j,d})$, $d \in [1, m]$, wherein $Hash_G( )$ is a hash function from an elliptic curve to the elliptic curve.

5. The computer-implemented method of claim 1, comprising storing the plurality of key images to the blockchain to be compared to key images of future transactions.

6. The computer-implemented method of claim 1, comprising verifying that a stored mapping relationship exists between each asset to be spent and the remitter public key.

7. The computer-implemented method of claim 1, comprising:

obtaining data representing the remittance transaction, and verifying, using range proofs in the data representing the remittance transaction, that the transfer amounts are not less than zero.

8. A non-transitory, computer-readable medium storing one or more instructions that, when executed by a computer system, cause the computer system to perform operations comprising:

obtaining, by a blockchain node of a blockchain, a linkable ring signature corresponding to a remittance transaction between a remitter and one or more payees, wherein the linkable ring signature comprises a plurality of key images, wherein a value of each key image is related to a remitter public key of the remitter, a remitter private key of the remitter, and an asset commitment value of a respective asset to be spent in the remittance transaction, and wherein the linkable ring signature is generated based on the remitter public key, the remitter private key, a remitter pseudo private key, and a remitter pseudo public key, wherein the remitter pseudo public key is based on the asset commitment values of the assets to be spent, transfer amount commitment values of transfer amounts corresponding to respective payees of the one or more payees, and a first set of one or more random numbers, and wherein the remitter pseudo private key is based on a second set of one or more random numbers;

determining, based on the linkable ring signature, that the remitter pseudo private key and the remitter pseudo public key satisfy a key pair relationship;

determining, based on the linkable ring signature, that a sum of asset amounts of the assets to be spent equals a sum of the transfer amounts;

determining, based on the linkable ring signature, that the plurality of key images are different from historical key images corresponding to previous remittance transactions; and based on determining that the plurality of key images are different from historical key images corresponding to previous remittance transactions, executing the remittance transaction.

9. The non-transitory, computer-readable medium of claim 8, wherein the linkable ring signature further comprises an additional key image generated based on a public key of a cover party and a pseudo public key of the cover party, the pseudo public key of the cover party being generated based on asset commitment values of assets held by the cover party, and wherein determining that the plurality of key images are different from the historical key images comprises determining that the additional key image is different from the historical key images.

10. The non-transitory, computer-readable medium of claim 9, wherein the operations comprise:

obtaining one or more pairs of intermediate parameters, wherein a first intermediate parameter of each pair corresponds to the remitter, and wherein a second intermediate parameter of each pair corresponds to the cover party; and verifying the one or more pairs of intermediate parameters, comprising recalculating the one or more pairs of intermediate parameters based on a third set of one or more random numbers or derived values of the third set of one or more random numbers included in the linkable ring signature, and verifying, based on the recalculated one or more pairs of intermediate parameters, that a respective ring value determining rule is satisfied between first and second intermediate parameters of each pair.

11. The non-transitory, computer-readable medium of claim 8, wherein the key images are $I_1$ to $I_m$, the remitter public key is $P_j$, the remitter private key is $x_j$, asset identifiers of the assets to be spent are $ID_1$ to $ID_m$, and wherein the key images are generated using the following equation:

$I_d = x_j \times Hash_G(P_j, ID_{j,d})$, $d \in [1, m]$, wherein $Hash_G(\ )$ is a hash function from an elliptic curve to the elliptic curve.

12. The non-transitory, computer-readable medium of claim 8, wherein the operations comprise storing the plurality of key images to the blockchain to be compared to key images of future transactions.

13. The non-transitory, computer-readable medium of claim 8, wherein the operations comprise verifying that a stored mapping relationship exists between each asset to be spent and the remitter public key.

14. The non-transitory, computer-readable medium of claim 8, comprising:
obtaining data representing the remittance transaction, and
verifying, using range proofs in the data representing the remittance transaction, that the transfer amounts are not less than zero.

15. A computer-implemented system, comprising:
one or more computers; and
one or more computer memory devices interoperably coupled with the one or more computers and having tangible, non-transitory, machine-readable media storing one or more instructions that, when executed by the one or more computers, cause the one or more computers to perform one or more operations comprising:
obtaining, by a blockchain node of a blockchain, a linkable ring signature corresponding to a remittance transaction between a remitter and one or more payees, wherein the linkable ring signature comprises a plurality of key images, wherein a value of each key image is related to a remitter public key of the remitter, a remitter private key of the remitter, and an asset commitment value of a respective asset to be spent in the remittance transaction, and
wherein the linkable ring signature is generated based on the remitter public key, the remitter private key, a remitter pseudo private key, and a remitter pseudo public key,
wherein the remitter pseudo public key is based on the asset commitment values of the assets to be spent, transfer amount commitment values of transfer amounts corresponding to respective payees of the one or more payees, and a first set of one or more random numbers, and wherein the remitter pseudo private key is based on a second set of one or more random numbers;

determining, based on the linkable ring signature, that the remitter pseudo private key and the remitter pseudo public key satisfy a key pair relationship;
determining, based on the linkable ring signature, that a sum of asset amounts of the assets to be spent equals a sum of the transfer amounts;
determining, based on the linkable ring signature, that the plurality of key images are different from historical key images corresponding to previous remittance transactions; and
based on determining that the plurality of key images are different from historical key images corresponding to previous remittance transactions, executing the remittance transaction.

16. The computer-implemented system of claim 15, wherein the linkable ring signature further comprises an additional key image generated based on a public key of a cover party and a pseudo public key of the cover party, the pseudo public key of the cover party being generated based on asset commitment values of assets held by the cover party, and
wherein determining that the plurality of key images are different from the historical key images comprises determining that the additional key image is different from the historical key images.

17. The computer-implemented system of claim 16, wherein the operations comprise:
obtaining one or more pairs of intermediate parameters, wherein a first intermediate parameter of each pair corresponds to the remitter, and wherein a second intermediate parameter of each pair corresponds to the cover party; and
verifying the one or more pairs of intermediate parameters, comprising
recalculating the one or more pairs of intermediate parameters based on a third set of one or more random numbers or derived values of the third set of one or more random numbers included in the linkable ring signature, and
verifying, based on the recalculated one or more pairs of intermediate parameters, that a respective ring value determining rule is satisfied between first and second intermediate parameters of each pair.

18. The computer-implemented system of claim 15, wherein the key images are $I_1$ to $I_m$, the remitter public key is $P_j$, the remitter private key is $x_j$, asset identifiers of the assets to be spent are $ID_1$ to $ID_m$, and wherein the key images are generated using the following equation:

$I_d = x_j \times Hash_G(P_j, ID_{j,d})$, $d \in [1, m]$, wherein $Hash_G(\ )$ is a hash function from an elliptic curve to the elliptic curve.

19. The computer-implemented system of claim 16, wherein the operations comprise storing the plurality of key images to the blockchain to be compared to key images of future transactions.

20. The computer-implemented system of claim 15, wherein the operations comprise verifying that a stored mapping relationship exists between each asset to be spent and the remitter public key.

* * * * *

UNITED STATES PATENT AND TRADEMARK OFFICE
CERTIFICATE OF CORRECTION

PATENT NO. : 10,958,443 B2
APPLICATION NO. : 16/945157
DATED : March 23, 2021
INVENTOR(S) : Wenbin Zhang It is certified that error appears in the above-identified patent and that said Letters Patent is hereby corrected as shown below:

In the Claims

Column 30, Line 52, Claim 19, please replace "claim 16," with -- claim 15, --.

Signed and Sealed this
Second Day of April, 2024

Katherine Kelly Vidal
*Director of the United States Patent and Trademark Office*